US007470071B2

(12) United States Patent  (10) Patent No.: US 7,470,071 B2
Ibaraki et al.  (45) Date of Patent: Dec. 30, 2008

(54) PAN HEAD APPARATUS AND CABLE ACCOMMODATING UNIT

(75) Inventors: Shoichi Ibaraki, Tokyo (JP); Masaru Kuwabara, Kanagawa (JP); Zhen Liang, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 840 days.

(21) Appl. No.: 10/724,691

(22) Filed: Dec. 2, 2003

(65) Prior Publication Data
US 2005/0052569 A1    Mar. 10, 2005

(30) Foreign Application Priority Data
Dec. 6, 2002   (JP)   ............... 2002-355688
Dec. 6, 2002   (JP)   ............... 2002-355689

(51) Int. Cl.
*G03B 17/00* (2006.01)
(52) U.S. Cl. ................. 396/348; 396/428; 248/187.1
(58) Field of Classification Search ................. 396/348, 396/350, 419, 420, 428, 450; 248/187.1, 248/176.1
See application file for complete search history.

(56) References Cited
U.S. PATENT DOCUMENTS 3,782,671 A * 1/1974 Igwe ................. 248/183.4
4,341,452 A * 7/1982 Korling ............. 396/428
4,530,580 A * 7/1985 Ueda et al. ........... 396/425
5,252,085 A  10/1993 Kato et al. ........... 439/164
5,801,919 A * 9/1998 Griencewic ............ 361/683
2001/0055487 A1  12/2001 Akada ................. 396/427

FOREIGN PATENT DOCUMENTS

| JP | 63-70185 | 5/1988 |
| JP | 2-4319 | 1/1990 |
| JP | 04320228 A | * 11/1992 |
| JP | 05-153717 | 6/1993 |
| JP | 5-207632 | 8/1993 |
| JP | 06-006644 | 1/1994 |
| JP | 06-055804 | 3/1994 |
| JP | 11-194407 | 7/1999 |
| JP | 2002/40553 | 2/2002 |
| JP | 2002-152960 | 5/2002 |
| JP | 2002-300431 | 10/2002 |

* cited by examiner

*Primary Examiner*—Reena Aurora
(74) *Attorney, Agent, or Firm*—Fitzpatrick, Cella, Harper & Scinto

(57) ABSTRACT

A pan head apparatus includes a head unit for mounting a camera, a base unit having a stationary portion, a rotating mechanism, and a rotary portion which is rotated with respect to the stationary portion by the rotating mechanism, and a connecting member which pivotally connects the head unit and the rotary portion of the base unit. In addition, a detector detects whether or not the head unit is set in an upright state with respect to the base unit by pivot motion of the connecting member. When the detector detects that the head unit is upright, rotation of the rotary portion by the rotating mechanism is permitted.

9 Claims, 18 Drawing Sheets

PAN HEAD APPARATUS AND CABLE ACCOMMODATING UNIT

FIELD OF THE INVENTION

The present invention relates to a pan head apparatus with a driving mechanism suitably used to mount an input device such as a camera unit. The present invention also relates to a cable accommodating unit suitably used in a camera device with a pan head which uses such a pan head apparatus.

BACKGROUND OF THE INVENTION

A camera device with a pan head is disclosed in, e.g., Japanese Utility Model Publication No. 2-4319 and Japanese Patent Laid-Open No. 2002-40553. A camera device with a pan head which is disclosed in these references is used as a monitor camera by, e.g., attaching its pan head to a wall surface.

Generally, a camera device with a pan head is designed to be used in an installed state, and accordingly its shape is not always suited for carrying. For example, to rotate the camera in a panning direction, an upright rotatable member is attached to a base as a stationary portion, and the camera is mounted on the upright rotatable member. When a camera device with a pan head of this type is to be carried, as the member where the camera is mounted is upright on the pan head, the camera device cannot be stored in a bag or the like at all and is bulky.

Along with the downsizing of a CCD image sensing device in recent years, as a camera device with a pan head which is used as it is placed on a table, one that can be carried easily and can be used as it is placed at a desired place is sought after.

The camera device with the pan head as described above has a rotating mechanism for rotating the camera. Generally, the center shaft portion of the rotating mechanism is fixed to a rotary portion connected to the camera. When the camera rotates, the center shaft portion also rotates.

In an arrangement as described above in which the rotating shaft portion rotates, cables extend through a hollow portion formed in the rotating shaft portion. Japanese Utility Model Publication No. 2-4319 mentioned above discloses a structure in which cables simply extend through a hollow portion in the rotating shaft. Japanese Patent Laid-Open No. 2002-40553 discloses a cable accommodating unit in which cables are spirally accommodated in a hollow portion so that any twist of the cables extending through the hollow portion may be eliminated. An arrangement in which the rotating shaft does not rotate together with the camera is also sought for as in a case wherein the central portion of the rotating shaft is fixed to a tripod or the like. If the rotating shaft does not rotate in this manner, the arrangement of the prior art cannot be employed.

In view of the problems of the prior art described above, for example, when a camera device with a pan head is formed, realization of a pan head apparatus that can provide an easy-to-carry device is sought after.

It is also desired to provide a cable accommodating structure which is suitable to a case wherein a rotating mechanism that does not rotate the rotating shaft with respect to the base portion is employed.

SUMMARY OF THE INVENTION

According to one aspect of the present invention, there is provided a pan head apparatus comprising: a head unit where a camera can be mounted; a base unit having a stationary portion, a rotating mechanism, and a rotary portion which is rotated with respect to the stationary portion by the rotating mechanism; and a connecting member which pivotally connects the head unit and the rotary portion of the base unit, wherein when the head unit and the base unit are pivoted by the connecting member, a state wherein the head unit and the base unit are placed substantially flat side by side and a state wherein the head unit is upright with respect to the base unit can be assumed.

Furthermore, according to another aspect of the present invention, there is provided a cable accommodating apparatus comprising: a first member having an upright inner wall; a second member, having an upright outer wall, opposing the first member, and rotatably mounted on the first member; and a cable having one end fixed to the first member and the other end fixed to the second member, the cable having a length at least necessary for rotation, wherein an excessive portion of the cable produced by rotation of the second member is accommodated in a space a width of which is defined by the inner wall and the outer wall and a height of which is defined by opposing surfaces of the first and second members, the excessive portion being arranged to extend along the inner wall and the outer wall respectively before and after a U-shaped bent portion, and the U-shaped bent portion moves in the space along with the rotation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

Preferred embodiments of the present invention will now be described in detail in accordance with the accompanying drawings.

FIGS. 1 to 5 are views for explaining the outer appearance of a camera device with a pan head according to an embodiment. The outline of the camera device with the pan head according to this embodiment will be described with reference to FIGS. 1 to 5.

Figure 1:
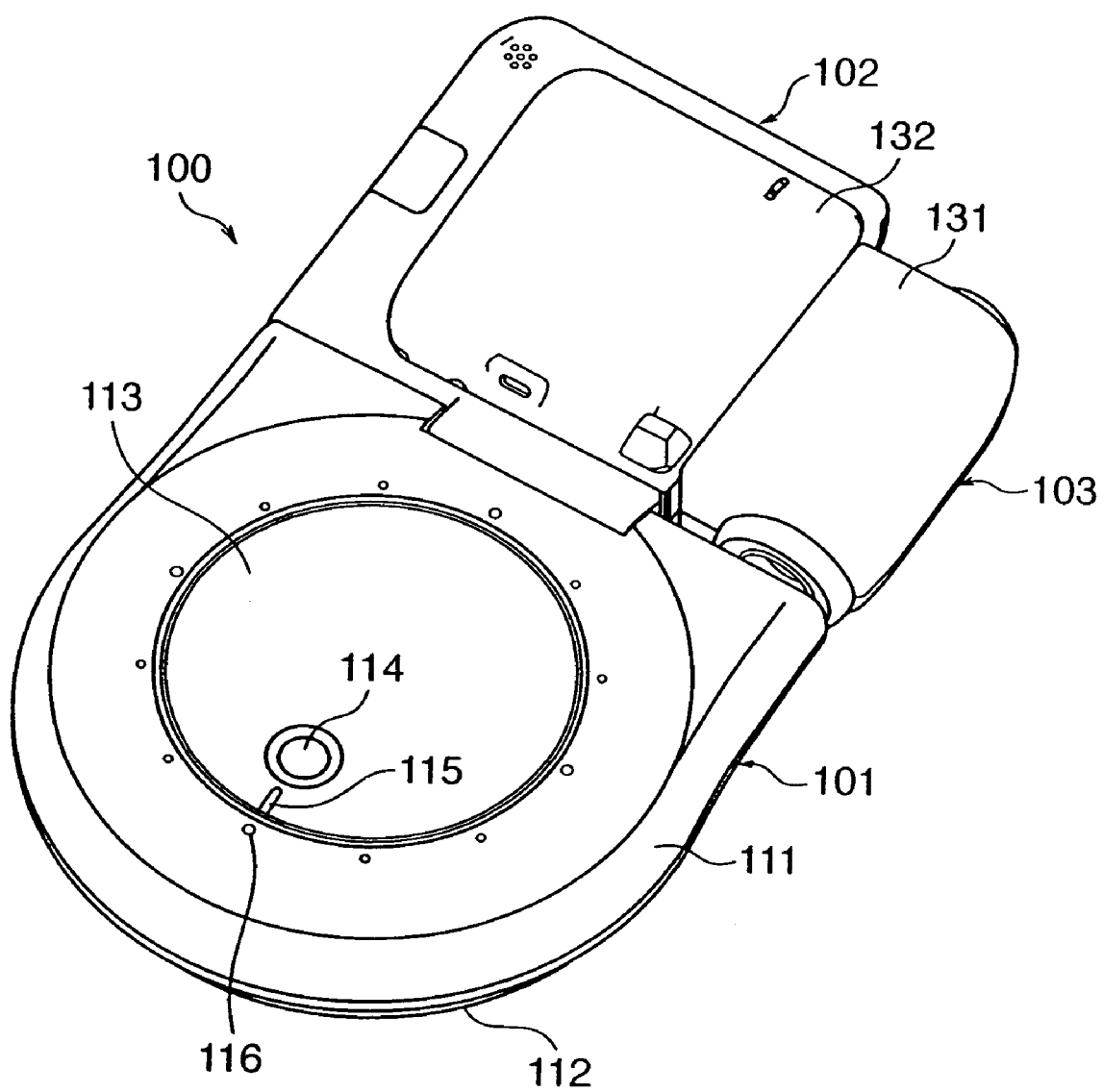
FIG. 1 is a view for explaining the outer appearance of a camera device with a pan head according to an embodiment, in which the respective units are set flat.
Figure 2:
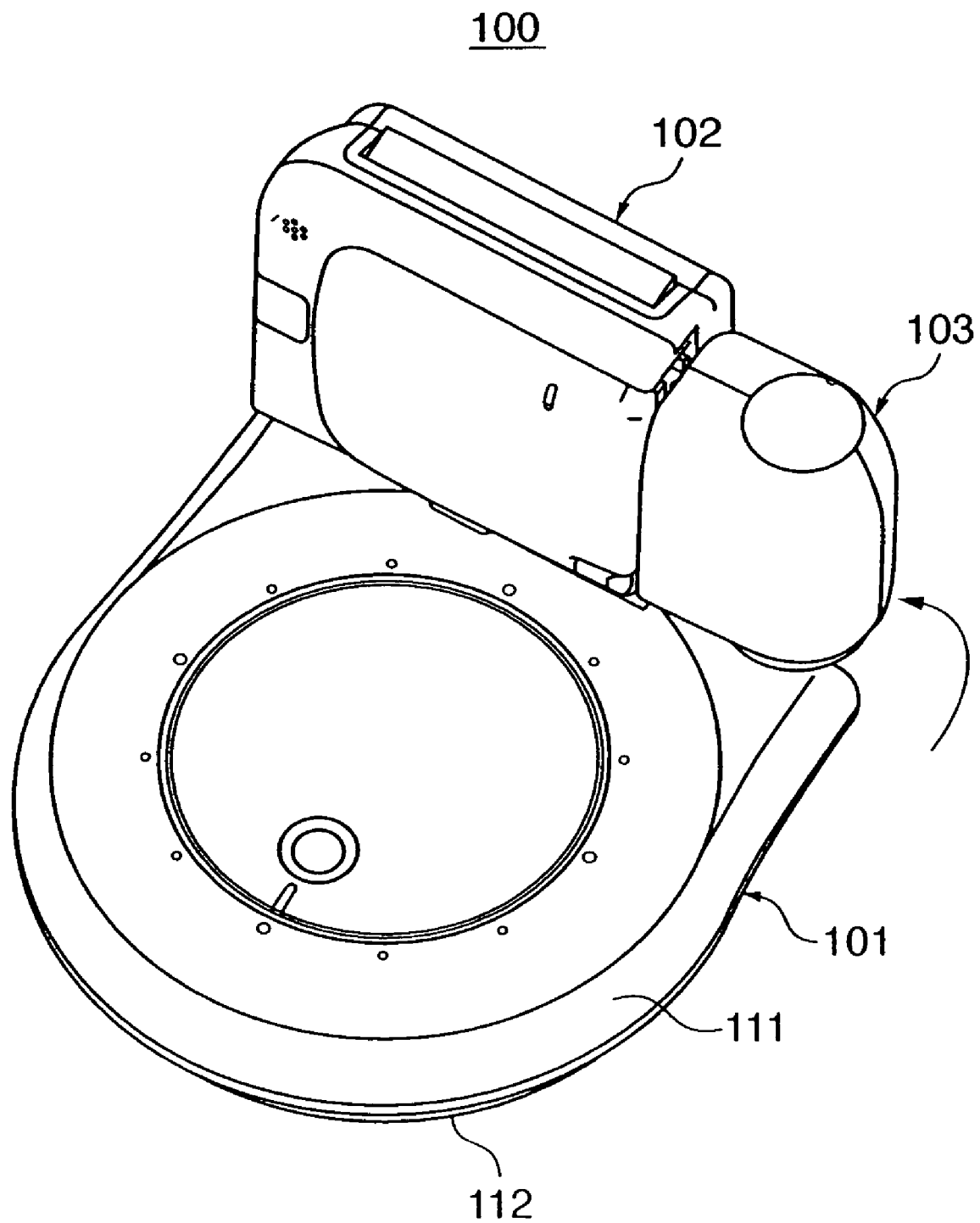
FIG. 2 is a view for explaining the outer appearance of the camera device with the pan head according to this embodiment, in which a head unit 102 is raised upright from the state of FIG. 1.
Figure 3:
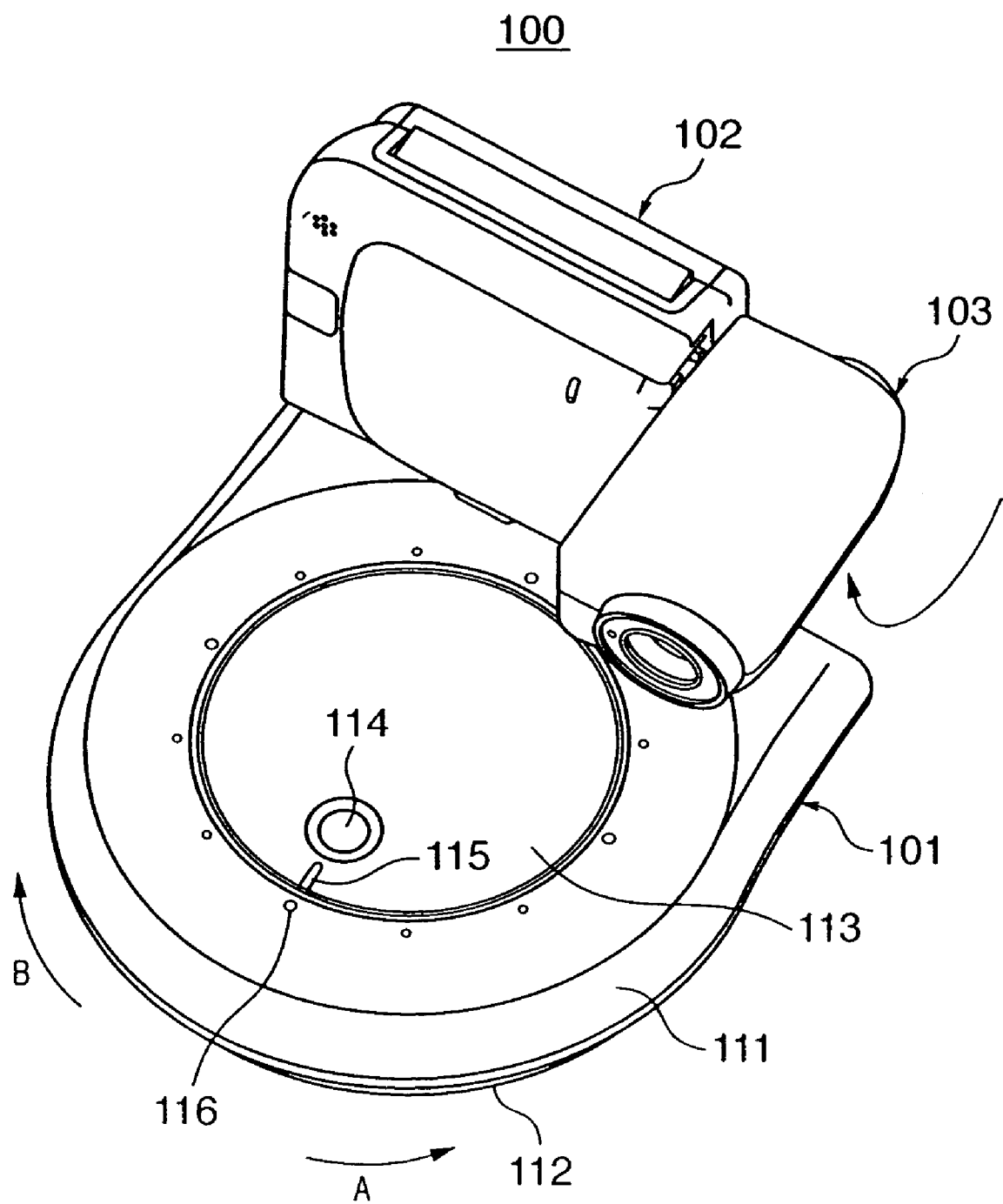
FIG. 3 is a view for explaining the outer appearance of the camera device with the pan head according to this embodiment, in which a camera unit 103 is rotated from the state of FIG. 2.

A camera device 100 with a pan head according to this embodiment has a base unit 101, head unit 102, and camera unit 103. FIG. 1 shows a state wherein the respective units 101 to 103 are developed flat. FIG. 2 shows a state wherein the head unit 102 is raised upright from the state of FIG. 1. FIG. 3 shows a state wherein the camera unit 103 is rotated from the state of FIG. 2.

The base unit 101 has a rotary portion 111 and stationary portion 112. The rotary portion 111 can be rotated with respect to the stationary portion 112 by a driving mechanism incorporated in the base unit 101 (see FIGS. 4 and 5). In the state of FIG. 1, as the head unit 102 and camera unit 103 physically interfere with the rotary portion 111, the rotary portion 111 is prohibited from rotating. The rotary portion 111 can rotate only when the head unit 102 is upright, as shown in FIGS. 2 and 3. This rotation prohibiting control is realized by providing a sensor (to be described later) which detects whether or not the head unit 102 is upright. Reference numeral 113 denotes a cap. The cap 113 is fixed to a rotation center shaft extending from the stationary portion 112. Therefore, even when the rotary portion 111 rotates, the cap 113 does not rotate. Reference numeral 114 denotes a power supply switch; and 115, a mark for indicating a scale 116 formed on the rotary portion 111.

The head unit 102 is connected to the base unit 101 through a hinge unit (not shown in FIG. 1; 104 in FIG. 6), and can realize a state shown in FIG. 1 (a state wherein the base unit 101 and head unit 102 are placed flat side by side) and a state shown in FIG. 2 (a state wherein the head unit 102 is raised upright from the base unit 101). The camera unit 103 can be mounted on the head unit 102. Also, an SD memory card, a CF (compact flash) card, or the like can be mounted on the head unit 102. Thus, an image photographed with the camera unit 103 can be stored.

The camera unit 103 is formed of a lens barrel 131 and camera main body portion 132. The camera main body portion 132 is mounted on the head unit 102 (see FIG. 6). The lens barrel 131 can rotate with respect to the camera main body portion 132, and can be rotated manually as shown in FIGS. 2 and 3.

Figure 4:
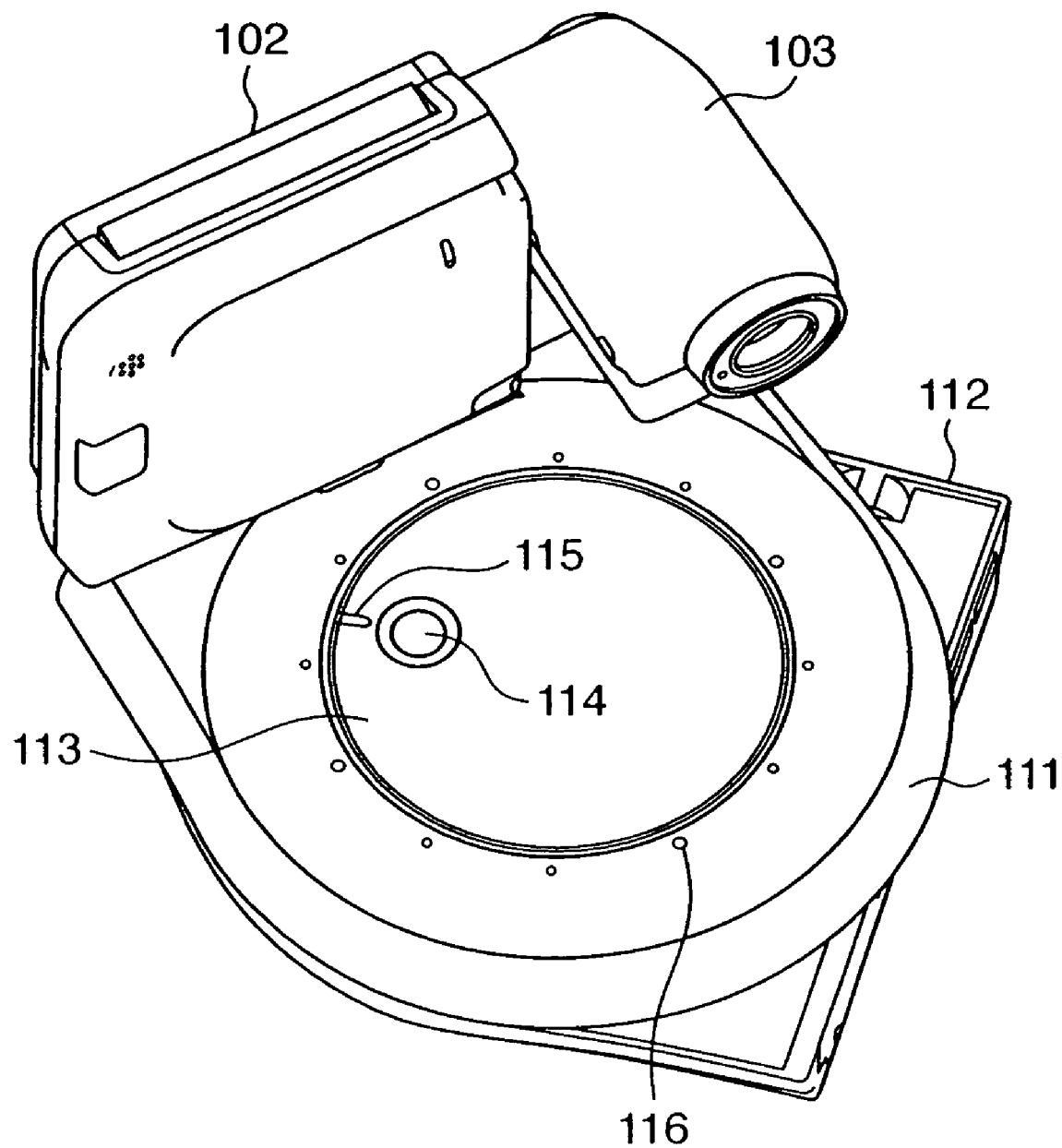
FIG. 4 is a view for explaining the outer appearance of the camera device with the pan head according to this embodiment, in which a rotary portion 111 is rotated in the direction of an arrow A from the state of FIG. 3.
Figure 5:
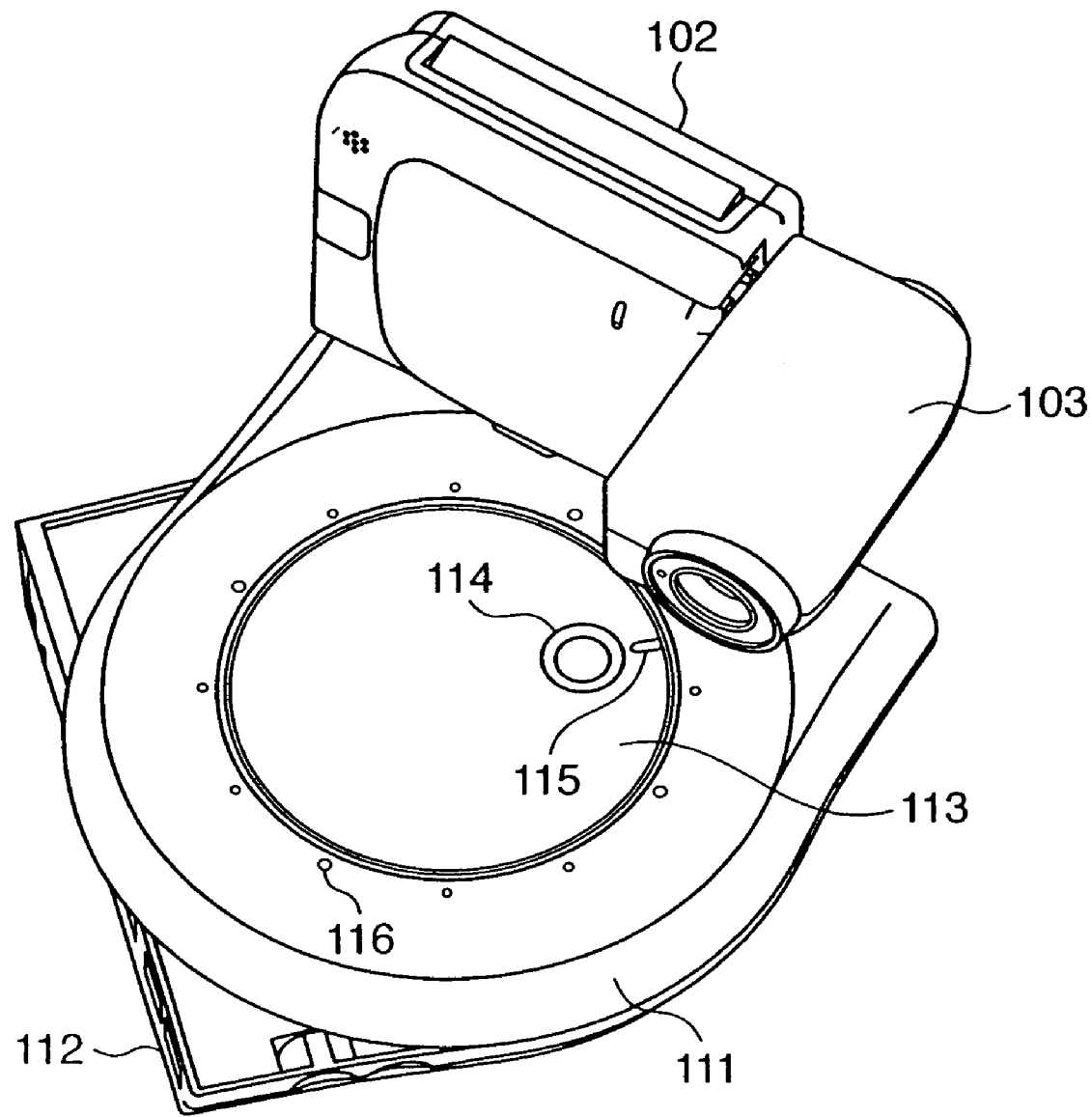
FIG. 5 is a view for explaining the outer appearance of the camera device with the pan head according to this embodiment, in which the rotary portion 111 is rotated in the direction of an arrow B from the state of FIG. 3.

FIG. 2 shows a state wherein the head unit 102 is upright from the base unit 101. In this state, the head unit 102 does not physically interfere with the rotation of the rotary portion 111, so that the rotary portion 111 can rotate. In the control operation, the state wherein the head unit 102 is upright as shown in FIG. 2 is detected, and rotation is permitted. The angle of the head unit 102 with respect to the base unit 101 is set at about 90°. The camera device 100 with the pan head should not fall down when it is set in the state as shown in FIGS. 3 to 5. For this purpose, the barycenter of the device 100 must be set close to the central position of the base unit 101. Therefore, the angle of the head unit 102 with respect to the base unit 101 is desirably 90° or less.

FIG. 3 shows a state wherein the camera unit 103 is rotated from the state of FIG. 2. In this state, the camera device 100 with the pan head can photograph as it is placed on a table or the like. The direction of the camera unit 103 need not be parallel to the stationary portion 112, but can be set at a desired tilt angle. Also, the camera unit 103 can be rotated in a direction opposite to the direction shown in FIG. 3. As described above, as the rotary portion 111 rotates with respect to the stationary portion 112 and the head unit 102 is fixed to the rotary portion 111, the head unit 102 moves in accordance with the rotation of the rotary portion 111 (FIGS. 4 and 5). In other words, a rotational mechanism incorporated in the base unit 101 realizes driving of the camera in the panning direction.

FIG. 4 shows a state wherein the rotary portion 111 is rotated in the direction of an arrow A from the state of FIG. 3, and FIG. 5 shows a state wherein the rotary portion 111 is rotated in the direction of an arrow B from the state of FIG. 3. As is apparent from FIGS. 4 and 5, the cap 113 is fixed with respect to the rotation of the rotary portion 111. As a result, the position of the mark 115 with respect to the stationary portion 112 does not change, and when the rotary portion 111 rotates, the scale 116 moves with respect to the mark 115. Hence, how much the rotary portion 111 has rotated can be known easily from the mark 115 and scale 116. Even when the rotary portion 111 is rotated, the power supply switch 114 does not move. Thus, the operability is improved.

Only the power supply switch 114 is arranged on the cap 113. Alternatively, for example, a rotary key may be arranged, and the driving mechanism in the base unit 101 may be operated in accordance with the operation of the rotary key, so that the rotary portion 111 rotates. As the cap 113 does not rotate, the rotation of the rotary portion 111 hardly affects the operability of an operation switch formed on the cap 113 adversely. Hence, the rotary key that instructs the above rotation can also be arranged. Alternatively, as the cap 113 is immobile, a display such as an LCD may be arranged on the cap 113.

Figure 6:
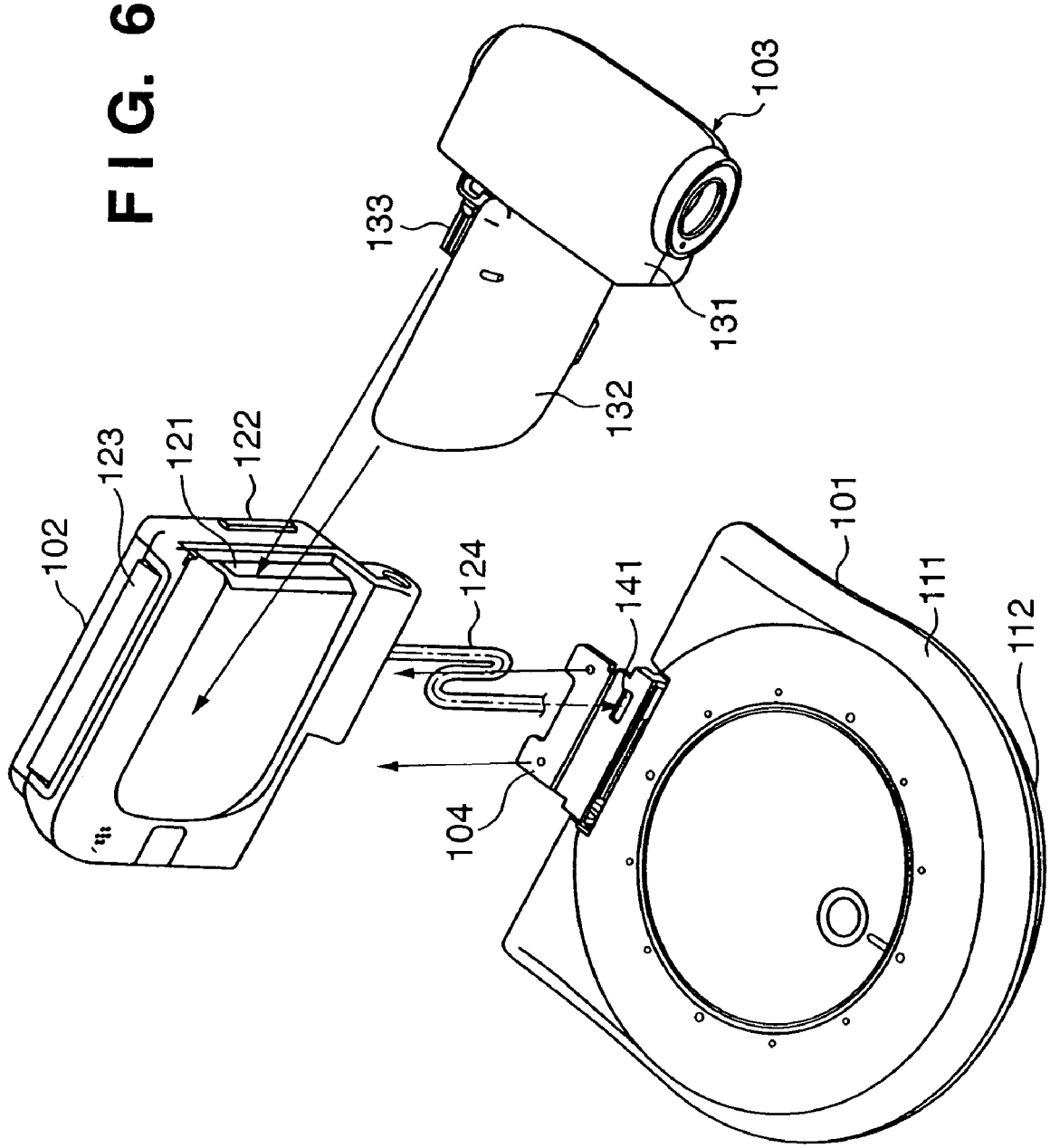
FIG. 6 is a view for explaining the mechanical and electrical connection of the respective units.

FIG. 6 is a view for explaining the mechanical and electrical connection among the respective units. As described above, the head unit 102 is connected to the base unit 101 through the hinge unit 104. Electrical connection between the base unit 101 and head unit 102 is obtained through flexible cables 124. The flexible cables 124 are guided into the base unit 101 through a cable passage hole 141 formed in the hinge unit 104.

A connector portion 121 to be connected to a connector 133 of the camera unit 103, an SD memory slot 122 where the SD memory card can be mounted, and a CF card slot 123 where the CF card can be mounted are formed in the head unit 102. An image signal obtained by photographing with the camera unit 103 is transmitted to the head unit 102 through the connector 133 and connector portion 121, is subjected to a necessary process, and is stored in the CF card or SD memory. Alternatively, when a communication module is mounted in the CF card slot 123, the photographed image can be sent to another PHS(Personal handyphone system) or cellular phone. Furthermore, when another PHS or cellular phone sends a command to instruct rotation (panning of the camera) of the rotary portion 111 or start and end of photographing, the camera device 100 can be remote-controlled. As the camera unit 103 can be detachably mounted, it can be replaced by a different type of camera unit (e.g., a wide-angle unit or telephoto unit) depending on how the camera device 100 will be used.

Figure 7B:
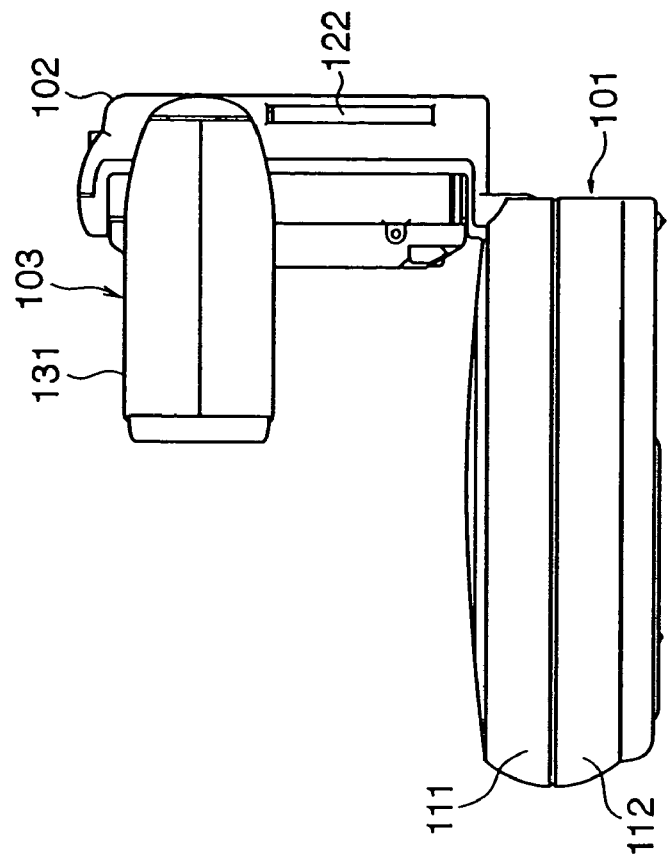
FIGS. 7A and 7B are front and side views, respectively, of the camera device with the pan head shown in FIG. 3.
Figure 7A:
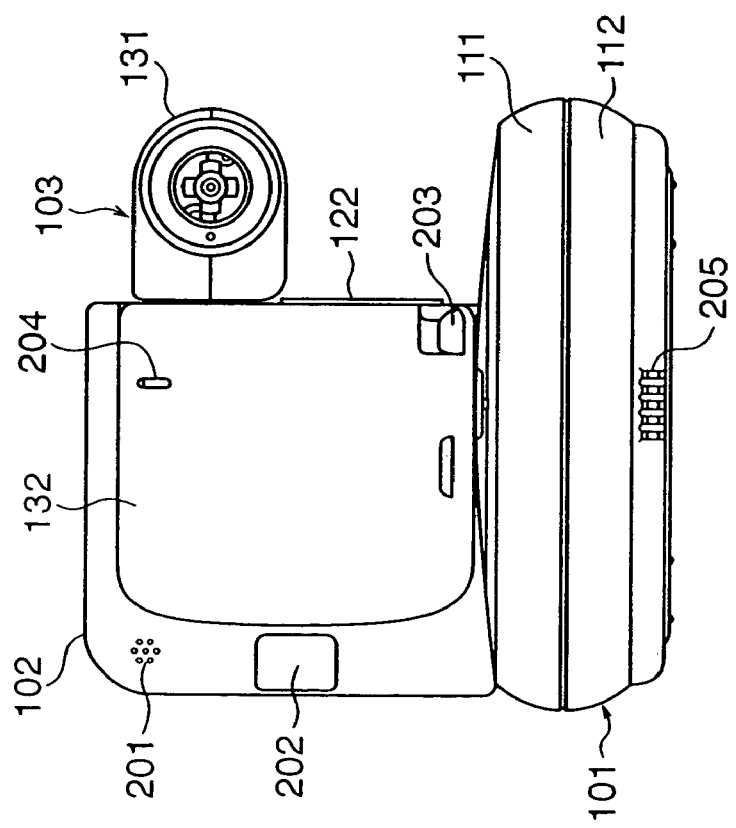
Figure 14:
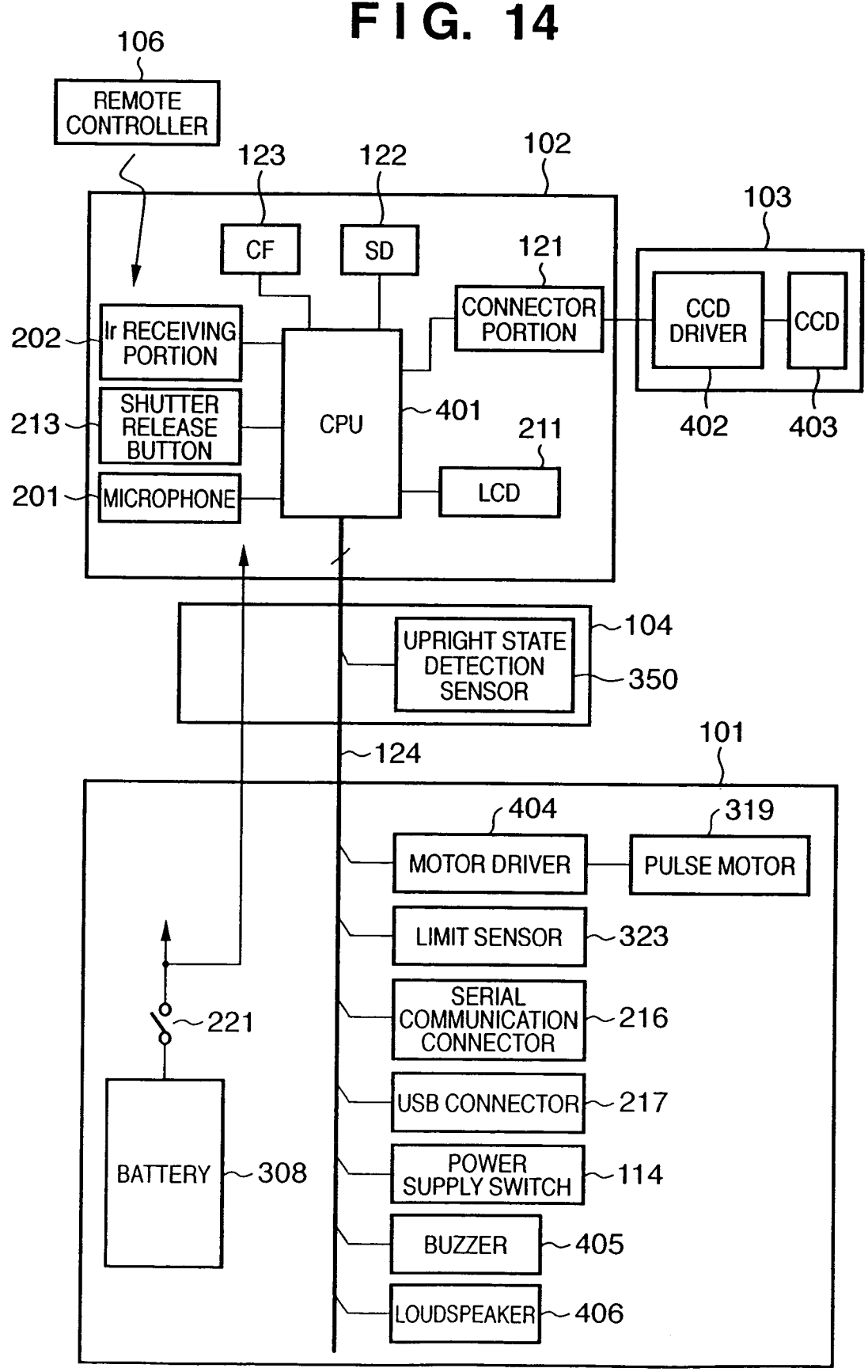
FIG. 14 is a block diagram schematically showing the electrical configuration of the camera device with the pan head according to this embodiment.

FIGS. 7A and 7B are front and side views, respectively, of the camera device with the pan head in the state shown in FIG. 3. As shown in FIG. 7A, the head unit 102 has a microphone 201 and an Ir light-receiving portion 202 for infrared communication. The microphone 201 is used for converting ambient noise into an electrical signal, and can be controlled such that when the camera device 100 with the pan head is used as a monitor camera, the camera device 100 starts photographing in response to noise picked by the microphone 201. The microphone 201 can also be used as a voice communication microphone through the communication module, or a telephone when it is used together with a loudspeaker 406 (to be described later) (FIG. 14). The Ir light-receiving portion 202 receives a photographing start command from a remote controller (not shown) or a rotation start command for the rotary portion 111 through infrared communication.

A camera eject button 203 and tally lamp 204 are formed on the camera main body portion 132 of the camera unit 103. When the camera eject button 203 is operated, the camera unit 103 can be removed from the head unit 102. The tally lamp 204 is turned on or flashes during camera photographing to inform the person to be photographed or surrounding people that the camera device 100 is photographing.

Reference numeral 205 denotes a loudspeaker opening. The loudspeaker opening 205 is formed to oppose the loudspeaker (not shown) incorporated in the base unit 101.

Figure 8B:
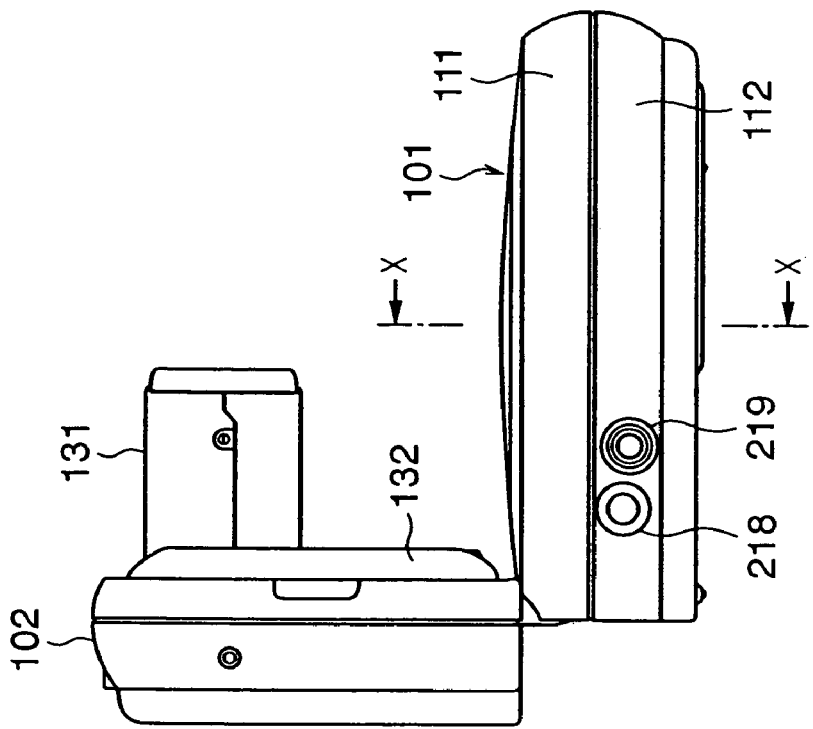
FIG. 8B is a side view, opposite to FIG. 7B, of the camera device 100 with the pan head in the state shown in FIG. 3.
Figure 8A:
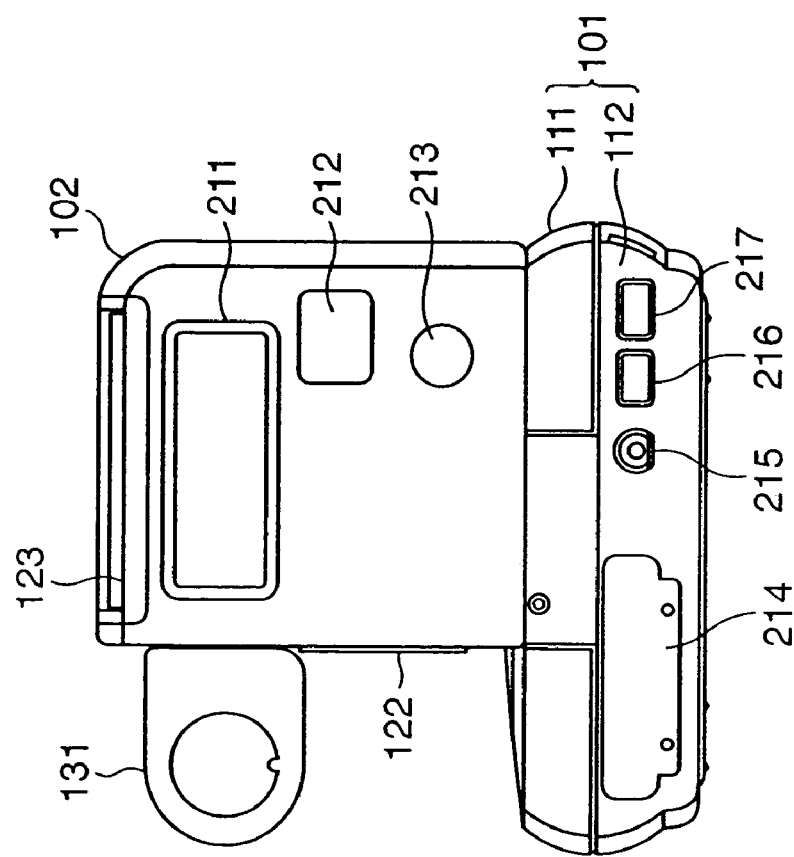
FIG. 8A is a rear view of a camera device 100 with a pan head in the state shown in FIG. 3.

FIG. 8A is a rear view of the camera device 100 with the pan head in the state shown in FIG. 3, and FIG. 8B is a side view, opposite to FIG. 7B, of the camera device 100 with the pan head in the state shown in FIG. 3. In FIG. 8A, reference numeral 211 denotes a liquid crystal display which displays the remaining battery amount or the respective types of operating states. Reference numeral 212 denotes an Ir receiving portion which is similar to the Ir receiving portion 202. Reference numeral 213 denotes a shutter release button which is used for photographing using the camera unit 103. Namely, the user can photograph using the camera unit 103 by directly pressing the shutter release button 213.

Reference numeral 214 denotes a battery lid which can be opened/closed for exchanging batteries. Reference numeral 215 denotes a sensor connector to be connected to an external sensor. As the external sensor, for example, a sound sensor (a sensor which reacts to a sound and used to release the shutter of the camera device 100), a door sensor (a sensor used to release the shutter when the interphone button is pressed), a human sensor (a sensor used to release the shutter when someone comes near), and the like are raised. Reference numeral 216 denotes a serial communication connector which enables serial communication with an external unit. Reference numeral 217 denotes a USB connector which enables communication through a USB with the external unit. Reference numeral 218 denotes a DC plug which receives DC supply from a DC adapter. The battery can also be charged through the DC plug 218. Reference numeral 219 denotes a line-out terminal which outputs a sound signal to the outside.

The connector which is to be connected through cables is formed in the stationary portion 112, as described above. Thus, the cables do not interfere with the rotation of the rotary portion 111.

Figure 9:
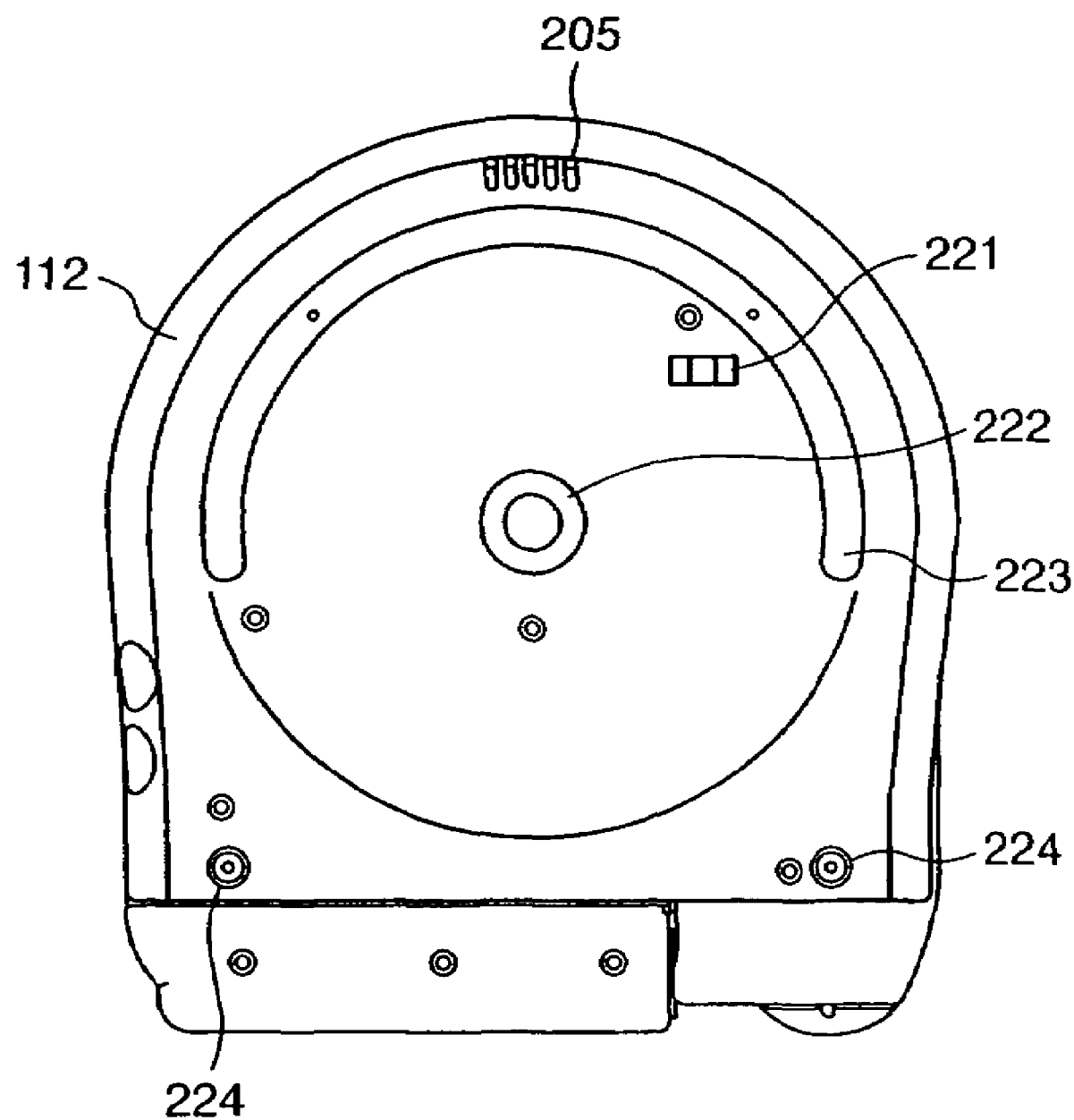
FIG. 9 is a bottom view of the camera device 100 with the pan head in the state shown in FIG. 3.

FIG. 9 is a bottom view, seen from the bottom surface, of the camera device 100 with the pan head in the state shown in FIG. 3, and shows the bottom surface of the stationary portion 112. Reference numeral 221 denotes a main power supply switch which turns on/off power supply from the incorporated battery to the camera device 100. Reference numeral 222 denotes a tripod screw hole. As described above, the rotation center shaft is fixed to the stationary portion 112 and is immobile with respect to the rotation of the rotary portion 111. Hence, the screw hole 222 can be formed at the center shaft portion. Reference numerals 223 and 224 denote rubber feet which prevent slippage and vibration which is caused by rotation.

Figure 10:
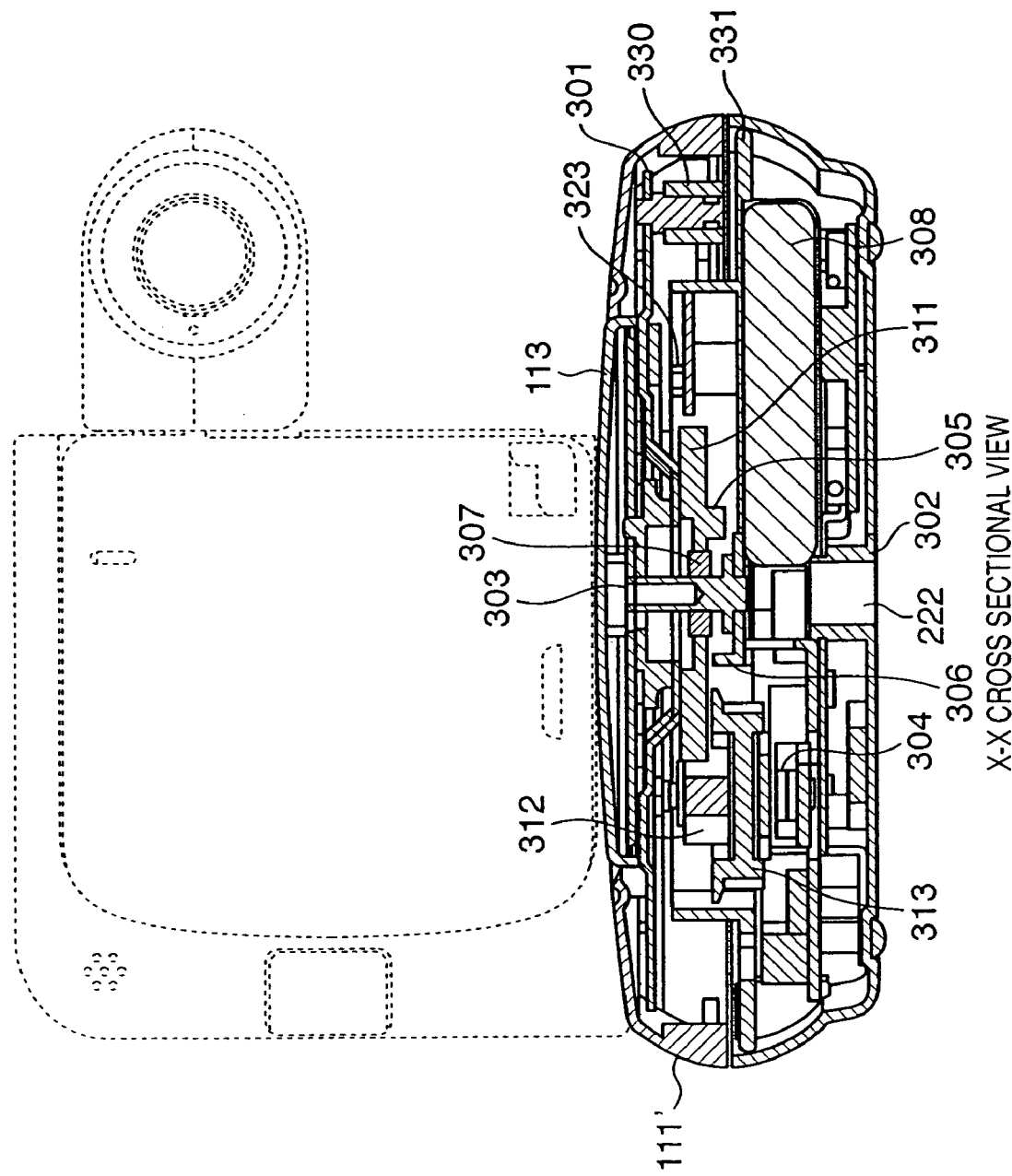
FIG. 10 is a sectional view taken along the line X-X of FIG. 8B.
Figure 11:
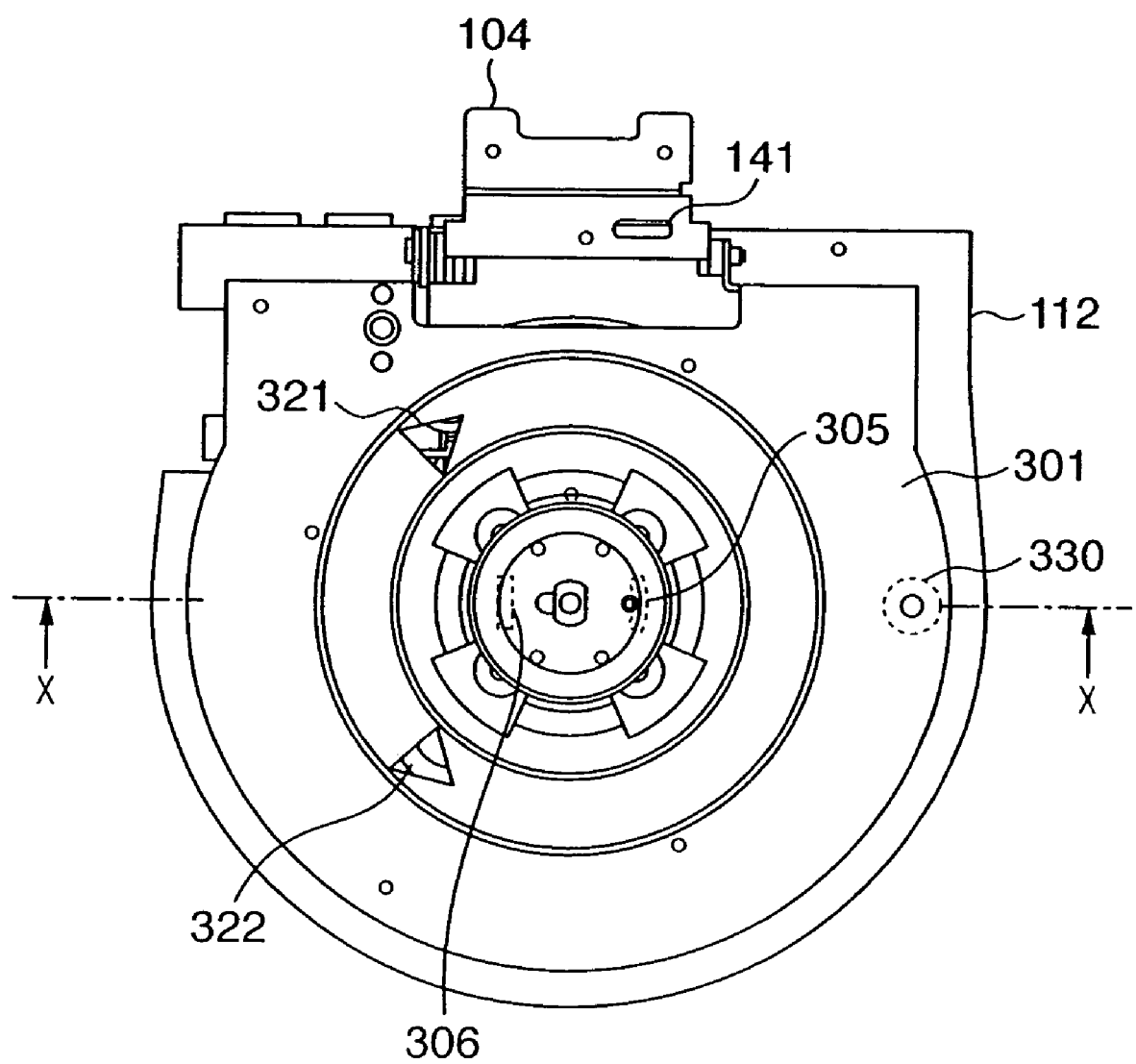
FIG. 11 is a view showing a state wherein the upper cover (111' in FIG. 10) and a cap 113 of the rotary portion 111 are removed.
Figure 12:
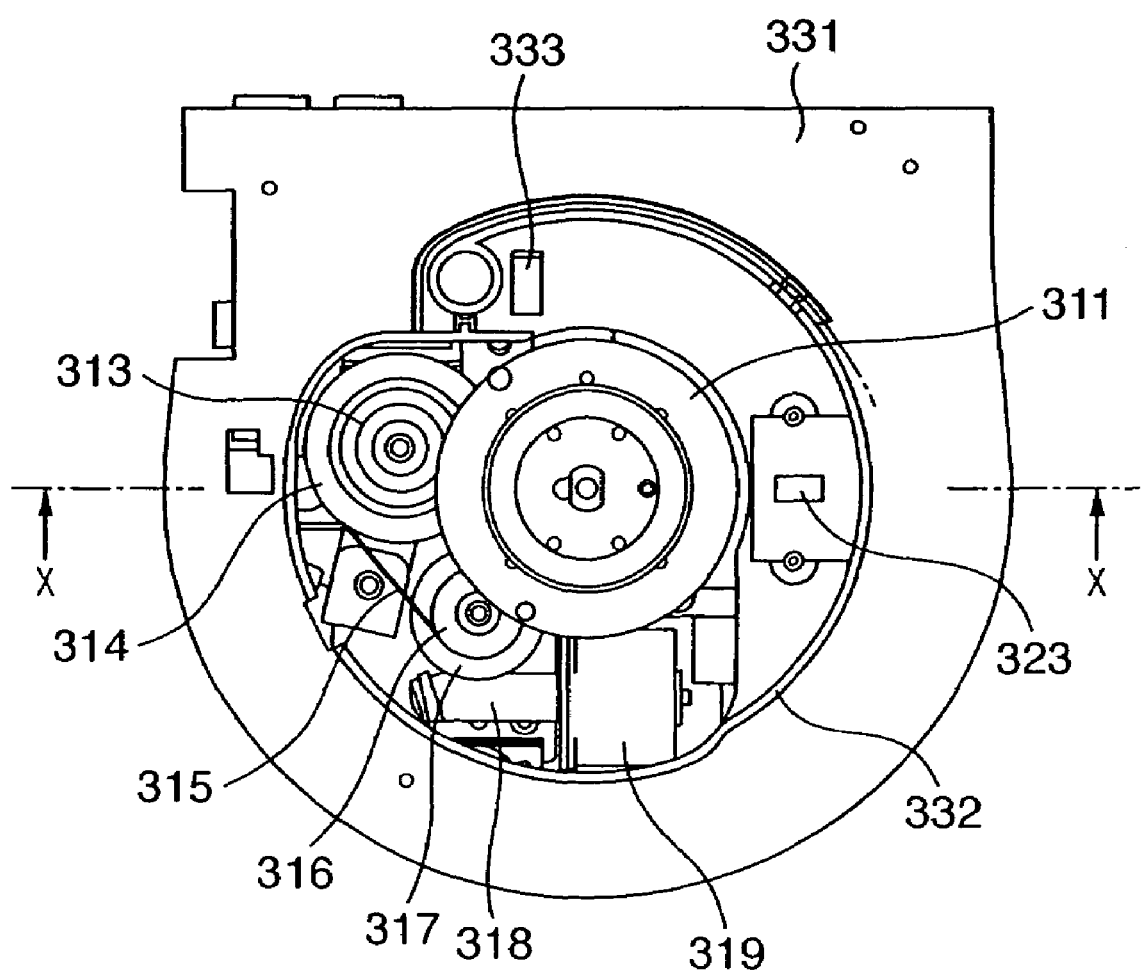
FIG. 12 is a view showing a state wherein a rotary plate 301 shown in FIG. 11 is removed.

FIGS. 10 to 12 are views showing the internal structure of the camera device 100 with the pan head according to this embodiment. FIG. 10 is a sectional view taken along the line X-X of FIG. 8B. FIG. 11 shows a state wherein an upper cover (111' in FIG. 10) of the rotary portion 111 and the cap 113 are removed. FIG. 12 shows a state wherein a rotary plate 301 shown in FIG. 11 is removed. FIGS. 11 and 12 also show the position of the line X-X.

Referring to FIG. 10, the rotary plate 301 is connected to a gear 311. The rotational drive force of a pulse motor (319 in FIG. 12) is transmitted to the gear 311. Hence, the rotary plate 301 rotates together with the gear 311 about a center shaft member 302. The upper cover 111' and hinge unit 104 are connected to the rotary plate 301, and rotate when the rotary plate 301 rotates. The cap 113 is fixed to the rotating shaft member 302 with a screw 303. The cap 113 does not rotate, as described above, and is immobile with respect to the rotation of the rotary plate 301 and upper cover 111'.

Referring to FIG. 12, reference numeral 319 denotes the pulse motor. A gear 318 is mounted on the rotating shaft of the pulse motor 319. The rotation of the pulse motor 319 is transmitted to a gear 317. A gear 316 is mounted on the rotating shaft of the gear 317, and a timing belt 315 connects the gear 316 to a gear 314. Consequently, the rotation force transmitted to the gear 317 is transmitted to the gear 314 through the timing belt 315. Furthermore, a gear 313 is mounted on the rotating shaft of the gear 314, and meshes with the gear 311. Hence, the rotation force transmitted to the gear 314 is transmitted to the gear 311 through the gear 313, and rotates the rotary plate 301.

Referring to FIG. 10 again, reference numeral 304 denotes a torque limiter which is provided in the rotation force transmission path between the gear 313 and a gear 312. When a trouble occurs to the rotation of the gear 311 during driving of the pulse motor 319, the torque limiter 304 can cause the gear 313 to idle with respect to the gear 312, so that an overload on the pulse motor 319 is prevented. The torque limiter 304 also allows manual rotation of the rotary portion 111. More specifically, when the user rotates the upper cover 111' manually, the rotation force is transmitted from the gear 311 to the gear 312. The torque limiter 304 operates to cause the gear 312 to idle with respect to the gear 313.

Portions denoted by reference numerals 305 and 306 make up a stopper that physically limits the rotation of the rotary portion 111 (FIGS. 10 and 12). When a projection 305 projecting from the gear 311 abuts against a projection 306 fixed to the stationary portion 112, the rotation of the stopper is limited. Reference numeral 307 denotes a bearing which guarantees smooth rotation of the gear 311 with respect to the rotating shaft member 302.

As shown in FIG. 11, the rotary plate 301 has openings 321 and 322. A sensor 323 (FIG. 12) detects the openings 321 and 322, so that it serves as a rotation limit detection sensor for the rotary portion 111. In this embodiment, the sensor 323 is a reflection type sensor, and the openings 321 and 322 have triangular shapes. As the triangles are formed in the directions as shown in FIG. 11, the light amount detected by the sensor 323 gradually increases toward the rotation end. Thus, when the light amount is detected and driving of the motor is controlled, appropriate deceleration can be performed toward the rotation end. Preferably, the rotation of the pulse motor 319 is controlled to stop by the sensor 323 immediately before the stopper mechanism formed by the projections 305 and 306 functions. Reference numeral 330 denotes a guide roller formed on the rotary plate 301. The guide roller 330 serves to align the plurality of flexible cables 124. This will be described later.

Referring to FIGS. 10 and 12, reference numeral 331 denotes a stationary portion middle plate having an inner wall 332 serving as a cable guide. Reference numeral 333 denotes a cable passage hole formed in the stationary portion middle plate 331. The flexible cables 124 extend through the cable passage hole 333. Referring to FIG. 10, reference numeral 308 denotes a battery which supplies necessary power to the respective portions of the camera device 100 with the pan head.

Figure 13A:
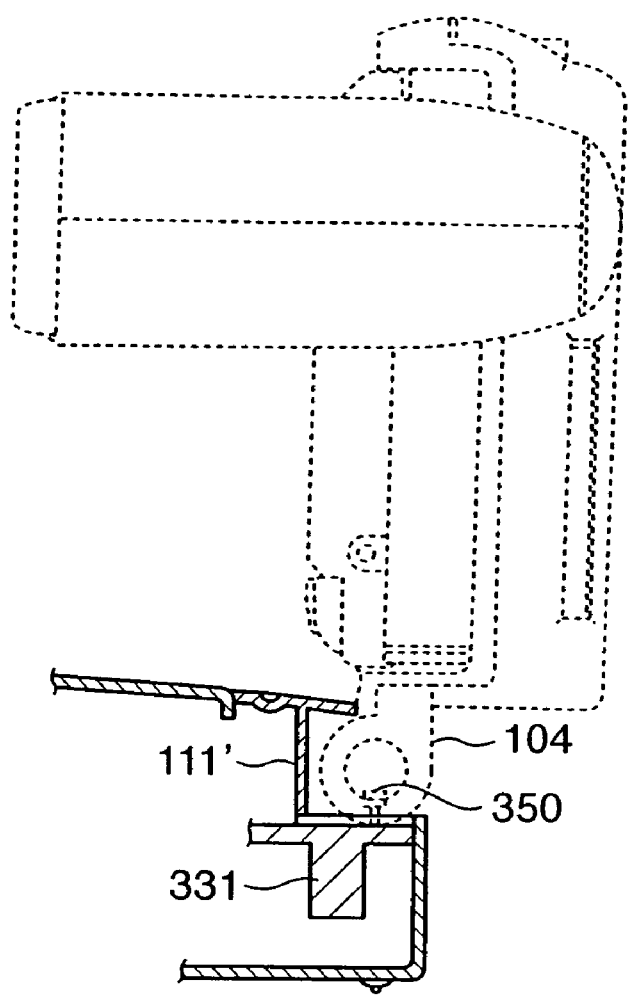
FIG. 13A is a view for explaining an upright state detection sensor 350.
Figure 13B:
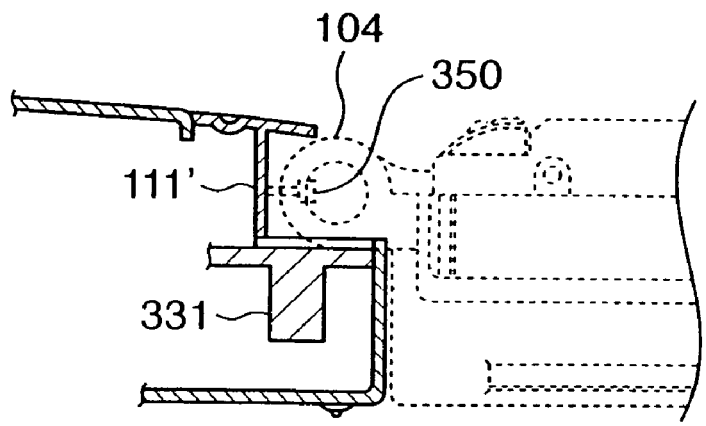
FIG. 13B is a view for explaining the upright state detection sensor 350.

FIGS. 13A and 13B are views for explaining an upright state detection sensor 350. The upright state detection sensor 350 is turned on (FIG. 13A) when the head unit 102 is raised upright as shown in FIG. 2, and is turned off (FIG. 13B) when the head unit 102 is laid down as shown in FIG. 1. In the camera device 100 with the pan head according to this embodiment, the distance from the central position of the rotating shaft of the hinge unit 104, which connects the head unit 102 to base unit 101 to each other, to the stationary portion middle plate 331 is shorter than the distance from the central position of the rotating shaft to the rotary portion 111'. Due to this difference in distance, the projection of the upright state detection sensor 350 is pushed in by the stationary portion middle plate 331 when the head unit 102 is raised upright (FIG. 13A), but projects when the head unit 102 is laid down (FIG. 13B).

FIG. 14 is a block diagram schematically showing the electrical configuration of the camera device 100 with the pan head of this embodiment which is described above. A CPU 401 which supervises the entire control operation of the camera device 100 with the pan head is arranged in the head unit 102. The SD memory slot 122, CF card slot 123, Ir receiving portions 202 and 212, shutter release button 213, microphone 201, LCD 211, and connector portion 121 described above are connected to the CPU 401. The camera unit 103 is connected to the CPU 401 through the connector portion 121. The CPU 401 controls a CCD driver 402 to acquire an image signal from a CCD 403.

Signal lines for exchanging respective types of signals between the respective constituent portions in the base unit 101 and the CPU 401 are formed through the plurality of flat cables 124. The flat cables 124 extend into the base unit 101 through the hinge unit 104 (cable passage hole 141). The hinge unit 104 has the upright state detection sensor 350. The upright state detection sensor 350 detects the upright state of the head unit 102, as described with reference to FIGS. 13A and 13B, and provides the detection signal to the CPU 401. The CPU 401 prohibits/permits the rotation of the rotary portion 111 on the basis of the detection signal.

In the base unit 101, a motor driver 404 converts a driving command from the CPU 401 into a pulse output to drive the pulse motor 319. The limit sensor 323, serial communication connector 216, USB connector 217, and power supply switch 114 described above are all connected to the CPU 401, to perform processes. For example, when the limit sensor 323 detects the opening 321 or 322, the rotary portion 111 reaches the limit position in the current rotational moving direction. Hence, the pulse motor 319 is stopped immediately, so that it receives only a rotational movement command only in a direction opposite to the previous rotational moving direction. Communication control of the serial communication connector 216 and USB connector 217 is supervised by the CPU 401. Furthermore, a buzzer 405 and the loudspeaker 406 are drive-controlled by the CPU 401.

The battery 308 is arranged in the base unit 101, and supplies power to the respective portions when the main power supply switch 221 is turned on. Reference numeral 106 denotes a remote controller which can operate the camera 100 with the pan head by infrared communication. The remote controller 106 can output, for example, a rotation command for the rotary portion 111, a photographing command, and the like.

Figure 15:
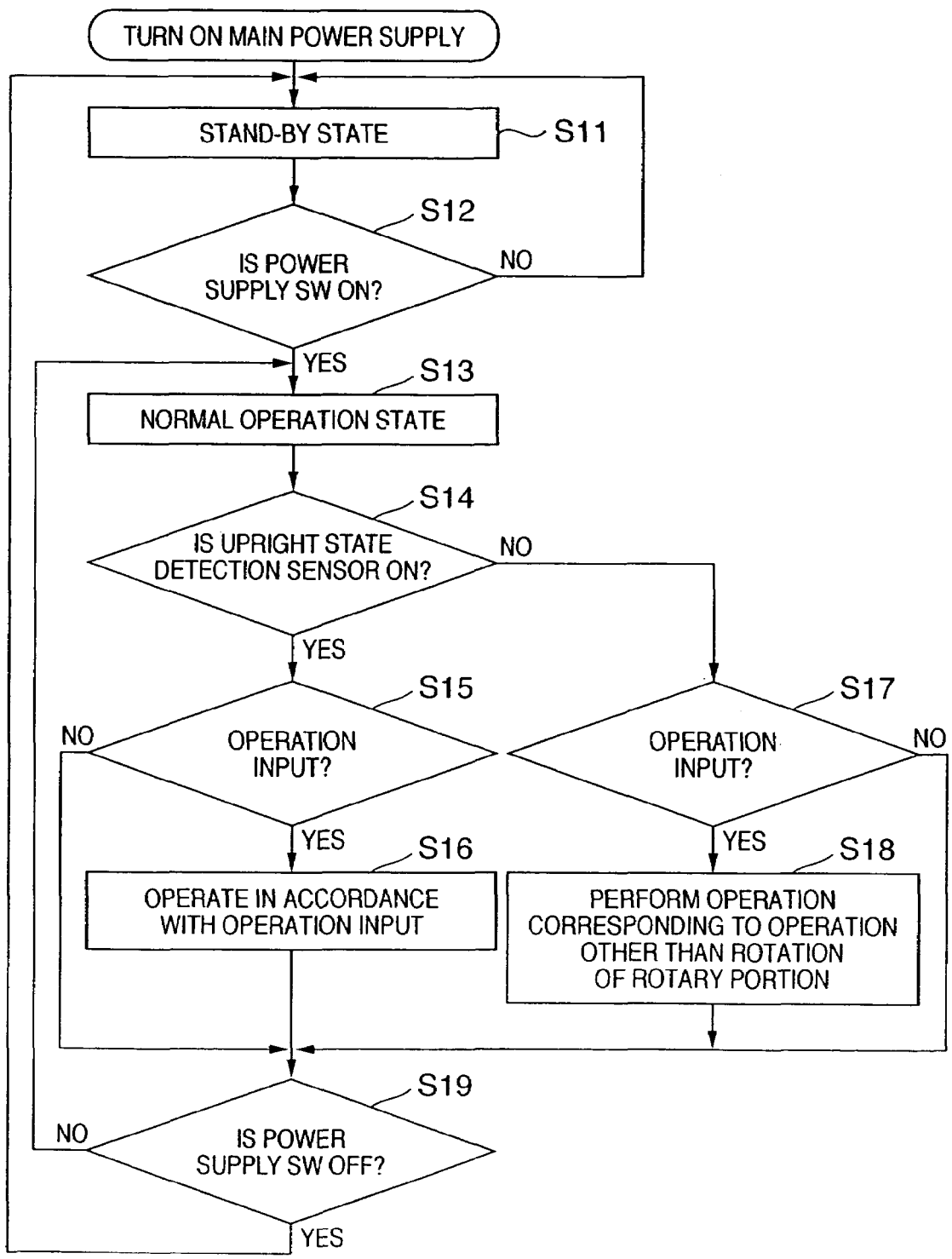
FIG. 15 is a flow chart for schematically explaining the operation of the camera device with the pan head according to this embodiment.

FIG. 15 is a flow chart for schematically explaining the operation of the camera device 100 with the pan head according to this embodiment. When the main power supply switch 221 is turned on, the device 100 is started in the stand-by state (step S11). In the stand-by state, power supply and the like are limited such that power consumption is minimum. In this state, when the power supply switch 114 formed on the cap 113 is turned on, the flow advances from step S12 to step S13, and a normal operation state (a state to wait for an operation command input) is set.

To realize the two states of the stand-by state and the normal operation state as described above, for example, the CPU 401 may be divided into a main CPU substrate and a sub CPU substrate. In the stand-by state, power may be supplied to only the sub CPU substrate. In the normal operation state, power may be supplied to both the sub CPU substrate and main CPU substrate. According to this embodiment, in the stand-by state, only the rotation of the rotary portion 111 is prohibited, and operations such as photographing are possible.

In the normal operation state, the processes of steps S14 to S19 are repeated. First, when an operation input is received while the upright state detection sensor 350 is ON (the head unit 102 is upright), the flow advances to step S16 through steps S14 and S15. In step S16, the operational process of the camera with the pan head is performed in accordance with the operation input. When an operation input is received while the upright state detection sensor 350 is OFF (the head unit 102 lies down), the flow advances to step S18 through steps S14 and S17. In step S18, operational processes other than the rotation of the rotary portion 111 are performed. For example, photographing is performed by operating the shutter release button 213.

When no operation input is received, the flow advances to step S19 through step S15 or S17. In step S19, whether the power supply switch 114 is turned off is checked. If power supply is not turned off by the power supply switch 114, the flow returns to step S13, and the above processes are repeated. If power supply is turned off by the power supply switch 114, the flow returns to step S11, and the camera device 100 with the pan head is set in the stand-by state.

The camera device 100 with the pan head of this embodiment having the above arrangement can be utilized as a monitor camera when it is used after it is placed as shown in FIGS. 3 to 5. If a communication module is mounted in the CF card slot 123 of the head unit 102, an image photographed by the camera unit 103 can be transmitted to a cellular phone or the like. Also, the camera device 100 with the pan head can be remote-controlled by a rotation command, a photographing command, or the like from the cellular phone.

As the camera device 100 with the pan head can be set flat as shown in FIG. 1, it can be easily carried in a bag or the like. The camera device 100 with the pan head can photograph by means of the shutter release button 213 whether it is in the state of either FIG. 1 or 3, and can be utilized as a digital camera that stores the photographed image in the SD memory or the like.

If the communication module is mounted as described above, the camera device 100 with the pan head, by using the microphone 201 and loudspeaker 406, can be utilized as a telephone. The camera device 100 with the pan head can also be utilized as a music player which stores music data with the SD memory by the MP3 scheme or the like and reproduces the music through the loudspeaker 406.

As described above, the pan head apparatus that can form the camera device with the pan head according to this embodiment comprises a head unit (102) where a camera unit (103) can be mounted, a base unit (101) having a stationary portion (112), a rotating mechanism, and a rotary portion (111) which is rotated with respect to the stationary portion by the rotating mechanism, and a connecting member (104) which pivotally connects the head unit and the rotary portion of the base unit, wherein when the head unit and the base unit are pivoted by the connecting member, a state (FIG. 1) wherein the head unit and the base unit are placed substantially flat side by side and a state (FIGS. 2 and 3) wherein the head unit is upright with respect to the base unit can be proposed. Since the pan head apparatus can be set flat, the camera device can be carried in a bag or the like, thus providing good portability.

The above pan head apparatus further comprises a camera unit (103) pivotally mounted on the head unit, wherein the base unit, head unit, and camera unit can be placed substantially flat side by side (FIG. 1). With this arrangement, since the camera device with the pan head can be set flat, it can be carried in a bag or the like, thus providing good portability. Also, the camera unit 103 can be rotated while the base unit 101 and head unit 102 are placed substantially flat side by side as shown in FIG. 1. Hence, the camera device can be handled like a so-called digital camera that can perform photographing by operating the shutter release button 213 shown in FIG. 8A.

In the base unit, part of the stationary portion (112) forms a rotation center shaft portion (302) of the rotary portion (111). In this manner, the rotation center portion does not rotate even when the rotary portion rotates. Thus, for example, a tripod attaching portion (222) can be formed on the rotation center shaft portion. Since the tripod can be attached to the rotation center shaft portion, even when the rotary portion 111 is operated, the balance of barycenter does not give way easily.

Furthermore, a round disk-like cap member (113) fixed to the rotation center shaft portion and exposed to the upper surface of the base unit is provided, and an operation switch is arranged on the cap member. Even when the rotary portion 111 rotates, the rotation center shaft portion does not rotate. Thus, when the operation switch is provided on the cap member, good operability is obtained. Although the power supply switch 114 is used in FIG. 1, alternatively, e.g., a switch to rotate the rotating shaft may be used.

The rotary portion (111) forms the upper surface of the base unit (101). The round disk-like cap member (113) is fixed to the rotation center shaft portion (302) and exposed to the upper surface of the base unit to cover part of the rotary portion. A scale to show the rotation amount is formed on either one of the cap member and rotary portion, and a mark for indicating the scale is formed on the remaining one of the cap member and rotary portion. FIG. 1 shows a case wherein a mark (115) is formed on the cap member and a scale (116) is formed on the rotary portion. This is convenient because the rotation amount of the rotary portion can be obtained easily.

The head unit (102) has a shutter release button (213). The shutter release button 213 is formed on the surface of the head unit that comes to the bottom surface side of the base unit when the head unit has fallen down.

An upright state detection sensor (350) which detects whether or not the head unit is upright with respect to the base unit is provided. When the sensor detects that the head unit is upright, the rotation of the rotary portion of the base unit is permitted. The rotary portion 111 cannot be rotated in a state as shown in, e.g., FIG. 1. Even in this state, the power supply is preferably turned on, so that various types of setting operations and photographing can be performed. In this embodiment, the upright state detection sensor is provided, as described above, to control rotation permission of the rotary portion 111. Hence, even if a command to rotate the rotary portion 111 is erroneously supplied in the state shown in FIG. 1, the rotary portion 111 does not rotate.

It is easily understood to the person skilled in the art that the upright state detection sensor 350 is not limited to the mechanical sensor as shown in FIGS. 13A and 13B, but various modifications can be made.

Still, when the upright state detection sensor erroneously detects an upright state, in the state of FIG. 1, the rotating mechanism undesirably drives to rotate the rotary portion 111. To prevent this, in the camera device with the pan head according to this embodiment, the rotating mechanism comprising a motor (319) which is mounted on the stationary portion (112) to generate a rotation force and a transmitting mechanism (311-318) to transmit the rotation force of the motor to the rotary portion has a torque limiter (304) in the transmission path of the rotation force in the transmitting mechanism. Thus, even if the motor is driven due to an erroneous operation of the upright state detection sensor while the motor cannot physically rotate, gear chipping or overload to the motor can be prevented. The torque limiter is also actuated when the rotary portion 111 is manually operated.

As described above, in the camera device 100 with the pan head according to this embodiment, the rotary portion 111 is rotated without rotating the rotation center portion. A flexible cable accommodating structure, which is suitable for the camera device 100 with the pan head according to this embodiment, will be described hereinafter.

Figure 16:
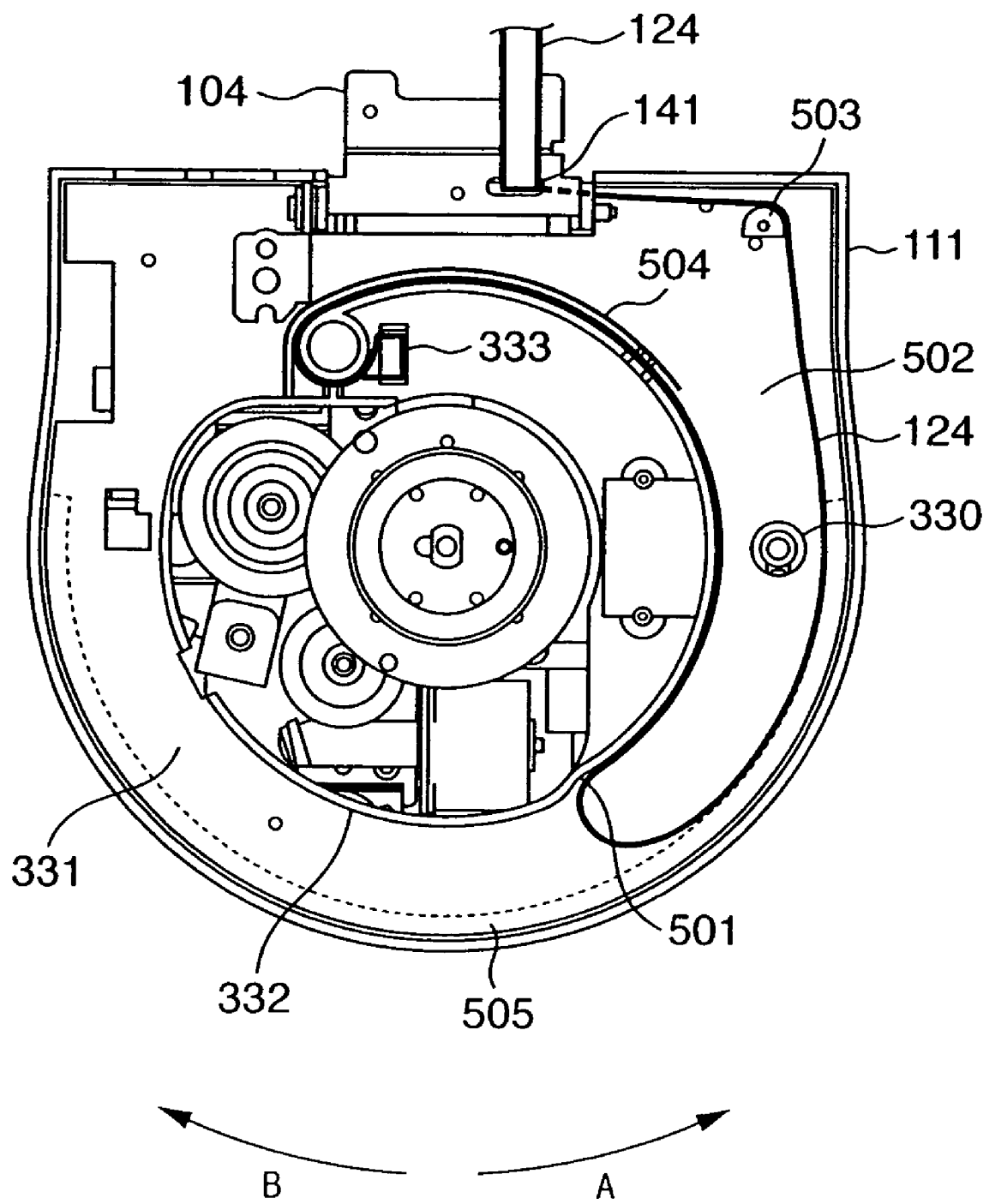
FIG. 16 is a view for explaining a cable accommodating method for the camera device 100 with the pan head according to this embodiment.
Figure 17:
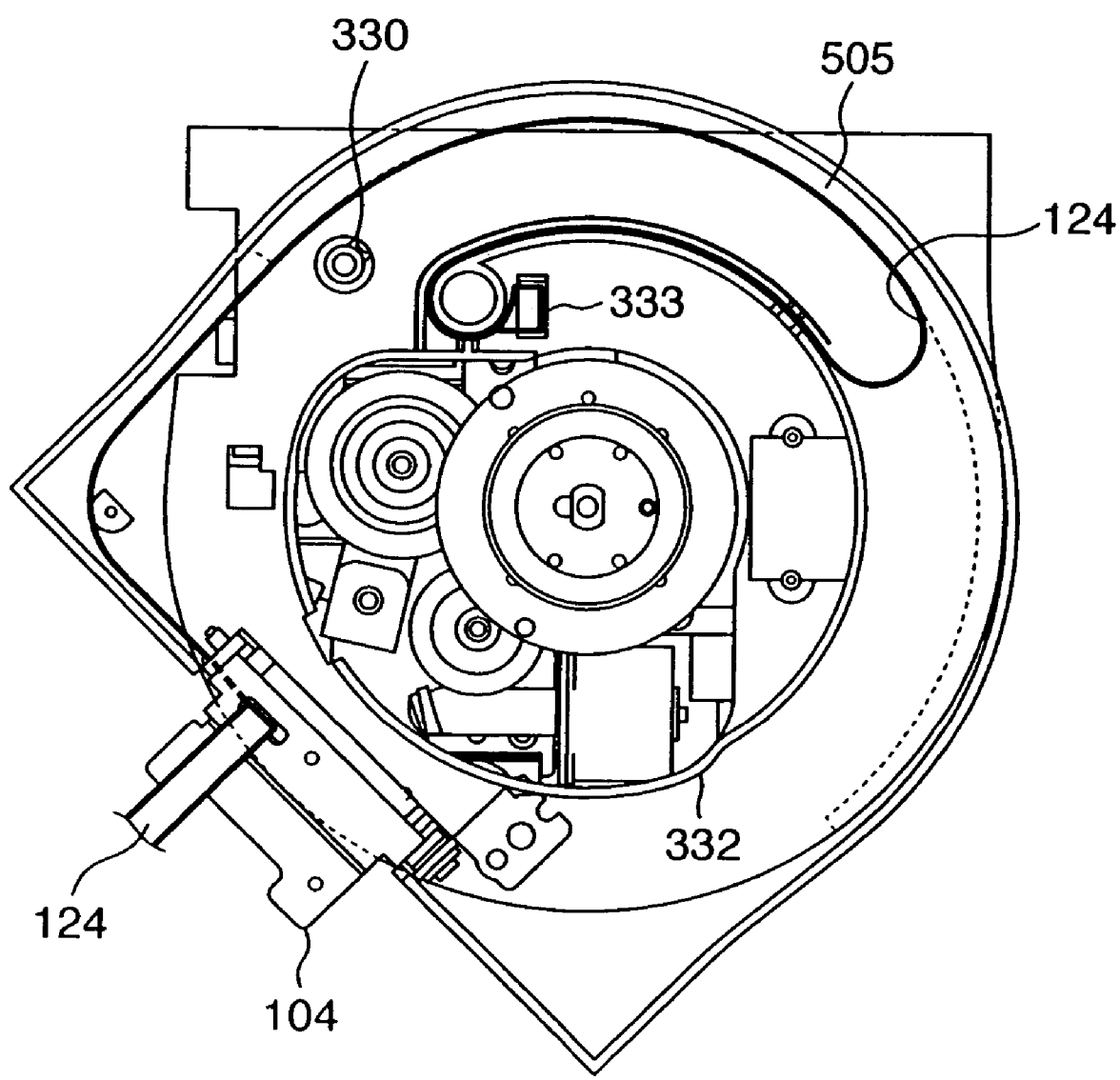
FIG. 17 is a view for explaining the cable accommodating method for the camera device 100 with the pan head according to this embodiment.
Figure 18:
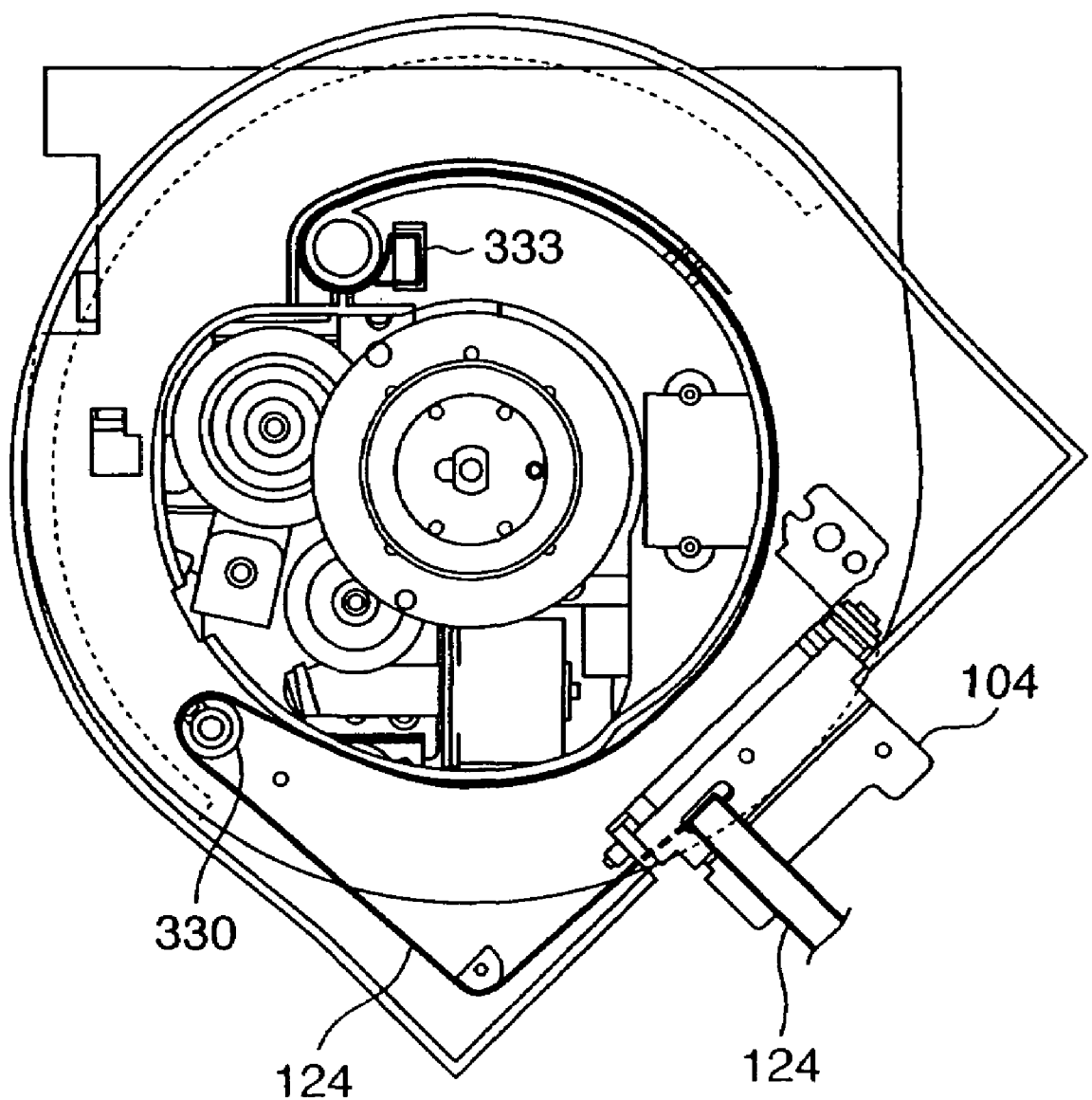
FIG. 18 is a view for explaining the cable accommodating method for the camera device 100 with the pan head according to this embodiment.

FIGS. 16 to 18 are views for explaining a cable accommodating method for the camera device 100 with the pan head according to this embodiment. FIGS. 16, 17, and 18 respectively correspond to the states of FIGS. 3, 4, and 5. The inner wall 332 stands upright from the stationary portion middle plate 331, and forms a space 502, together with an outer wall 505 formed on the upper cover 111' of the rotary portion 111, to accommodate the cables. The inner wall 332 and the wall surface of the upper cover 111' serve as a cable guide. According to this embodiment, the upper and lower portions of the space 502 are defined by the rotary plate 301 and stationary portion middle plate 331.

As shown in FIG. 16, the flexible cables 124 from the head unit 102 enter the space 502 through the cable passage hole 141, and extend along the inner surface of the outer wall 505 of the upper cover 111' through a guide 503. The flexible cables 124 then turn back in a U shape, extend along the wall surface of the inner wall 332, and run between a guide 504 and the inner wall 332 to reach the cable passage hole 333. The guide 504 makes the flexible cables 124 to extend along the inner wall 332 reliably. The flexible cables 124 are substantially fixed at the positions of the cable passage holes 141 and 333.

When the rotary portion 111 rotates in the direction of the arrow A, the U-shaped portion of the flexible cables 124 moves (the rotational speed of the U shape is ½ the rotation speed of the rotary portion 111). Those portions of the flexible cables 124 which extend along the inner wall 332 decrease, while those portions of the flexible cables 124 which extend along the outer wall 505 increase. FIG. 17 shows a state wherein the rotary portion 111 is rotated until the terminal end position in the direction of the arrow A. In this state, those portions of the flexible cables 124 which extend along the inner wall 332 become a minimum, and conversely those portions of the flexible cables 124 which extend along the outer wall 505 become a maximum.

When the rotary portion 111 rotates in the direction of the arrow B of FIG. 16, the U-shaped portion of the flexible cables 124 moves along with this rotation. Those portions of the flexible cables 124 which extend along the outer wall 505 decrease, while those portions of the flexible cables 124 which extend along the inner wall 332 increase. When the rotary portion 111 rotates in the direction B to a certain degree, the guide roller 330 comes into contact with the flexible cables 124. When the rotary portion 111 is rotated until the terminal end position of the direction of the arrow B, the guide roller 330 applies an appropriate tension to the flexible cables 124, as shown in FIG. 18. This appropriate tension aligns the plurality of flexible cables 124 in the stacked state.

A changing portion 501 is formed on the inner wall 332. Hence, the width of the space 502 for accommodating the cables, which is defined by the inner wall 332 and outer wall 505, changes before and after the changing portion 501. The second width which is on the opposite side (terminal end side) to the first width closer to the cable passage hole 333 than the changing portion 501 is set smaller than the first width. According to this embodiment, the curvature of the inner wall 332 is changed at the changing portion 501. Other than the changing portion 501, the inner wall 332 is formed with the same curvature.

In the camera device 100 with the pan head according to this embodiment which has this cable accommodating structure, when the power supply is turned on, the rotary portion 111 is rotated in the A direction to the limit, and is rotated after that in the B direction to the limit, so that the cable aligning function of the guide roller 330 is utilized effectively. This operation can align the bundle of the flexible cables every time the power supply is turned on.

This rotating operation can also serve as a rotating operation necessary for indexing the position of the pulse motor (indexing the rotation middle point of the rotary portion 111). In the state as shown in FIG. 1, however, the base unit 101 and head unit 102 interfere. Thus, rotation in the directions A and B is performed when two conditions are satisfied, i.e., the state of FIG. 2 is detected by the upright state detection sensor 350 and the power supply is ON, and the rotation middle point is indexed.

The cable accommodating structure as described above comprises a stationary portion (112) having an upright inner wall (332), a rotary portion (111), having an upright outer wall (505), opposing the stationary portion, and rotatably mounted on the stationary portion, and a flexible cable (124) having one end fixed to the stationary portion 112 and the other end fixed to the rotary portion 111. An excessive portion of the cable with a length at least necessary for rotation is accommodated in a space the width of which is defined by the inner wall 332 and outer wall 505 and the height of which is defined by the opposing surfaces of a stationary portion middle plate (331) of the stationary portion (112) and the rotary plate (301). The excessive portion is arranged to extend along the inner wall 332 and outer wall 505 respectively before and after the U-shaped bent portion. The U-shaped bent portion moves in this space along with the rotation.

With the above arrangement, the excessive portion of the signal cable which is necessary for rotation can be stored in a small space. Even when the rotary portion 111 is rotated repeatedly, since the U-shaped bent portion moves, the cable is not bent at one point, and the risk of cable disconnection is small. Furthermore, when the U-shaped bent portion moves, the side end surface of the cable may abut against the stationary portion middle plate or the rotary plate. However, as the side end surface of the cable can maintain large wear strength easily, no problem occurs.

In the above arrangement, the inner and outer walls preferably stand vertically upright with respect to the stationary portion middle plate and the rotary plate. According to the above arrangement, a guide (503) for guiding the excessive portion of the cable to extend along the outer wall and a guide (504) for guiding the excessive portion of the cable to extend along the inner wall are provided. Thus, the cable extends along the outer and inner walls more reliably.

The cable accommodating structure according to this embodiment has an arrangement which is more appropriate for accommodating a cable bundle obtained by binding a plurality of flat cables in the direction of thickness. One of the problems occurring when cables are bundled together is that the cables may become loose. For example, while the camera device 100 with the pan head is being carried, if the flexible cables 124 become loose in the above space and rotation is repeated in this state, the edge of the flexible cables may be damaged to cause disconnection, or the flexible cables may be twisted and pulled to lead to a fracture of the flexible cables themselves. When the camera device 100 moves while the edge of the flexible cables abuts against the stationary portion middle plate or the rotary disk (while photographing is performed while panning the camera), if the flexible cables are loose, sliding noise may occur, and the microphone 201 may pick up the sliding noise. In this state, the flexible cables vibrate while sliding. This fluctuates the torque and causes variations in rotation. If the plurality of flexible cables are bundled together with a tape or the like so that they will not become loose, a difference in moving speed of the cables that occurs between the inner and outer sides of the U-shaped bent portion cannot be absorbed to cause flexure of the cables, and consequently the same problem as that described above occurs.

In contrast to this, according to this embodiment, for example, the space changes its width at a predetermined portion within the moving range of the U-shaped bent portion, so that the space comprises a first region having a first width and a second region having a second width smaller than the first width. The first and second regions are aligned along the direction in which the cables wind on the inner wall. The first and second regions are formed when, e.g., the curvature of the inner wall changes at a predetermined portion (501) within the moving range.

In the above space, when the U-shaped bent portion is moved in the direction in which the cables wind on the inner wall (that is, when the rotary portion 111 rotates such that the U-shaped bent portion is pushed out by the outer wall), if the space has the same width entirely, the cables cannot be pushed out easily, and in the worst case, the cables cannot move forward any more. When the curvature is gradually changed to gradually decrease the width, the rotational torque increases at the terminal end, and in the worst case, rotation stops before the terminal end. Also, the cables that are bundled together become loose, leading to a trouble such as disconnection. In contrast to this, according to the present inventor, if two regions having different widths are formed as in the above embodiment, the above problems can be solved.

Preferably, it is effective if the predetermined portion falls on the central portion of the moving range of the U-shaped bent portion. Alternatively, it is effective if the predetermined portion at the central position of the rotation falls in the vicinity of the U-shaped bent portion as in FIG. 16.

A cylindrical member (330) fixed to the rotary plate and projecting into the space is provided. The cylindrical member is arranged at a position to abut against the cables at the terminal end of rotation in the direction in which the cables wind on the inner wall.

As in the above arrangement, the bundled cables can be aligned when the guide roller abuts against the cables at the terminal end. For example, while the camera device 100 with the pan head is being carried, if the flexible cables 124 become loose in the above space and rotation is repeated in this state, the edge of the flexible cables may be damaged to cause disconnection, or the flexible cables may be twisted and pulled to lead to a fracture of the flexible cables themselves. These problems can be prevented by aligning the cables as described above. For this purpose, when the power supply is turned on, the rotary portion 111 may be preferably rotated once between the rotation terminal ends, thus aligning the cables.

Furthermore, overrotation is reliably prevented by the limit sensor or stopper mechanism. Hence, even if the user rotates the rotary portion 111 manually, the rotary portion 111 will not rotate exceeding the terminal end position, and the guide roller 330 will not excessively pull the flexible cables.

Devices other than the camera unit can be mounted on a pan head apparatus having the base unit 101 and head unit 102 described above. The devices that can be mounted include a light, a stereo microphone, and the like. For example, when a light is mounted, it may be turned on and off in accordance with the reaction of the sensor, so that the pan head apparatus can be utilized as a security device. Alternatively, a stereo microphone may be mounted on the pan head apparatus, and the microphone may be controlled to be always directed to where noise is produced.

As has been described above, according to the present invention, when a camera device with a pan head is formed, a device that can be carried easily can be provided.

According to the present invention, there is provided a cable accommodating structure which is suitable when a rotating mechanism that does not rotate a rotating shaft portion with respect to the base of the device is employed.

As many apparently widely different embodiments of the present invention can be made without departing from the spirit and scope thereof, it is to be understood that the invention is not limited to the specific embodiments thereof except as defined in the claims.

What is claimed is:

1. A pan head apparatus comprising:
    a head unit for mounting a camera;
    a base unit having a stationary portion, a rotating mechanism, and a rotary portion which is rotated with respect to said stationary portion by said rotating mechanism;
    a connecting member which pivotally connects said head unit and said rotary portion of said base unit; and
    a detector which detects whether or not said head unit is set in an upright state with respect to said base unit by pivot motion of said connecting member,
    wherein when said detector detects that said head unit is in the upright state, rotation of said rotary portion by said rotating mechanism is permitted.

2. An apparatus according to claim 1, further comprising a camera unit pivotally mounted on said head unit,
    wherein a state wherein said base unit, said head unit, and said camera unit are placed substantially flat side by side can be assumed.

3. An apparatus according to claim 1, wherein in said base unit, part of said stationary portion forms a rotation center shaft portion of said rotary portion.

4. An apparatus according to claim 3, wherein a tripod attaching portion is formed on said rotation center shaft portion.

5. An apparatus according to claim 3, further comprising a round disk-like cap member fixed to said rotation center shaft portion and exposed to an upper surface of said base unit, wherein an operation switch is arranged on said cap member.

6. An apparatus according to claim 3, wherein
    said rotary portion forms an upper surface of said base unit,
    a round disk-like cap member is fixed to said rotation center shaft portion and exposed to the upper surface of said base unit to cover part of said rotary portion, and
    a scale to show a rotation amount is formed on either one of said cap member and said rotary portion, and a mark for indicating the scale is formed on the remaining one of said cap member and said rotary portion.

7. An apparatus according to claim 1, wherein a shutter release button is arranged on said head unit.

8. An apparatus according to claim 1, wherein said rotating mechanism includes
    a motor which is mounted on said stationary portion to generate a rotation force,
    a transmitting mechanism to transmit the rotation force of said motor to said rotary portion, and
    a torque limiter formed in a transmission path of the rotation force in said transmitting mechanism.

9. A pan head apparatus according to claim 1, wherein when said detector detects that said head unit is not in the upright state, rotation of said rotary portion by said rotating mechanism is prohibited.

* * * * *